United States Patent [19]
Ito et al.

[11] Patent Number: 5,941,793
[45] Date of Patent: Aug. 24, 1999

[54] APPARATUS FOR CONTROLLING AUTOMATIC TRANSMISSION OF MOTOR VEHICLE

[75] Inventors: Yoshio Ito, Toyota; Yasunari Nakamura, Nagoya; Takashi Ohta, Toyota; Kazuyuki Shiiba, Toyota; Kunihiro Iwatsuki, Toyota; Tooru Matsubara, Toyota, all of Japan

[73] Assignee: Toyota Jidosha Kabushiki Kaisha, Toyota, Japan

[21] Appl. No.: 08/808,427

[22] Filed: Feb. 28, 1997

[30] Foreign Application Priority Data

| Mar. 1, 1996 | [JP] | Japan | 8-044986 |
| Aug. 30, 1996 | [JP] | Japan | 8-229547 |

[51] Int. Cl.$^6$ .................................................. F16H 61/10
[52] U.S. Cl. .............................. 477/120; 477/121; 477/78
[58] Field of Search ............................. 477/78, 120, 121, 477/108; 701/55, 56

[56] References Cited

U.S. PATENT DOCUMENTS

| 5,101,350 | 3/1992 | Tokoro | 477/78 X |
| 5,129,288 | 7/1992 | Sasaki et al. | 477/120 |
| 5,148,721 | 9/1992 | Anan et al. | 477/121 X |
| 5,544,053 | 8/1996 | Nakashima | 477/78 X |

FOREIGN PATENT DOCUMENTS

| 63-270962 | 11/1988 | Japan . |
| 1-261547 | 10/1989 | Japan . |
| 3-117773 | 5/1991 | Japan . |
| 4-191562 | 7/1992 | Japan . |
| 5-71626 | 3/1993 | Japan . |

*Primary Examiner*—Khoi Q. Ta
*Attorney, Agent, or Firm*—Oblon, Spivak, McClelland, Maier & Neustadt, P.C.

[57] ABSTRACT

It is an object of the invention to provide a shift control apparatus which does not cause a vehicle driver to feel uncomfortable when shift control means resumes normal shift control using a predetermined shift pattern. Where return-to-normal determining means 105 determines that a condition or conditions under which the shift control means 102 resumes shift control using a MEDIUM MODE shift pattern is/are satisfied, return-to-normal permitting means 116 permits the shift control means 102 to resume the shift control using the MEDIUM MODE shift pattern when an output control member release determining means 108 determines that an accelerator pedal 58 has been released. In this arrangement, the driver does not feel uncomfortable even if the transmission is shifted up immediately after the shift control means 102 resumes the shift control using the MEDIUM MODE shift pattern.

18 Claims, 13 Drawing Sheets

FIG. 2

| POSITIONS OF SHIFT LEVER AND TRANSMISSION | | SOLENOID COILS | | $C_1$ | $C_2$ | $B_1$ | $B_2$ | $F_1$ | $B_3$ | $F_2$ | $C_0$ | $F_0$ | $B_0$ |
|---|---|---|---|---|---|---|---|---|---|---|---|---|---|
| | | No.1 | No.2 | | | | | | | | | | |
| P | | ⊗ | ⊗ | | | | | | | | | | |
| R | | ⊗ | ⊗ | | ○ | | | | ○ | | | | |
| N | | ⊗ | ⊗ | | | | | | | | ○ | | |
| D | 1st | ○ | × | ○ | | | | | | | ○ | ○ | |
| | 2nd | ○ | ○ | ○ | | | ○ | | | ○ | ○ | ○ | |
| | 3rd | × | ○ | ○ | | | ○ | ○ | | | ○ | ○ | |
| | O/D | × | × | ○ | ○ | | ○ | | | | ○ | | ○ |
| S | 1st | ○ | × | ○ | | | | | | | ○ | ○ | |
| | 2nd | ○ | ○ | ○ | | | ○ | | | ○ | ○ | ○ | |
| | 3rd | × | ○ | ○ | ○ | | ○ | ○ | | | ○ | ○ | |
| | (O/D) | × | × | ○ | ○ | | ○ | | | | ○ | | ○ |
| L | 1st | ○ | × | ○ | | ○ | | ○ | | | ○ | ○ | |
| | 2nd | ○ | ○ | ○ | | | ○ | ○ | ○ | ○ | ○ | ○ | |

APPARATUS FOR CONTROLLING AUTOMATIC TRANSMISSION OF MOTOR VEHICLE

BACKGROUND OF THE INVENTION

1. Field of the Invention

The present invention relates to a shift control apparatus for an automatic transmission of a motor vehicle.

2. Description of Related Art

There is known an automatic transmission of a motor vehicle whose change gear ratio is variable or which can be placed in a selected one of a plurality of gear positions. The vehicle automatic transmission of this type uses a shift control apparatus for changing the change gear ratio or gear position of the transmission according to a predetermined shift pattern, based on actual running conditions of the vehicle as represented by a throttle opening angle (engine load) and a vehicle speed, for example.

In the shift control apparatus for the automatic transmission of the motor vehicle as described above, however, the change gear ratio or gear position is uniformly changed using the predetermined shift pattern, and the obtained gear ratio or gear position does not always match what the driver intends or wishes to achieve.

In view of the above problem, a shift control apparatus has been proposed which determines that the driver wishes to establish a SPORTY DRIVE mode if the rate of change of the throttle opening angle becomes equal to or higher than a predetermined value, and switches from a NORMAL (MEDIUM) MODE shift pattern to a SPORTY MODE shift pattern. Upon a lapse of a predetermined time after the switching, the shift control apparatus cancels shift control using the SPORTY MODE shift pattern and resumes shift control using the NORMAL (MEDIUM) MODE shift pattern. This type of shift control apparatus is disclosed in laid-open Publication No. 3-117773 of unexamined Japanese Patent Application, for example.

In the shift control technology disclosed in the above-identified publication, however, the shift control using the SPORTY MODE shift pattern is uniformly or invariably changed back to the shift control using a predetermined shift pattern, such as the MEDIUM MODE shift pattern, upon a lapse of the predetermined time after the normal shift control using the predetermined (MEDIUM MODE) shift pattern is switched to the SPORTY MODE shift control using the SPORTY MODE shift pattern. Accordingly, the transmission may be unexpectedly shifted up when the normal shift control is resumed, regardless of the driver's operations to drive the vehicle, thus making the driver feel uncomfortable or disagreeable due to the unexpected shift-up action.

SUMMARY OF THE INVENTION

The present invention has been developed in the light of the above-described situations. It is therefore an object of the invention to provide a shift control apparatus which does not make the driver uncomfortable when the normal shift control using a predetermined shift pattern is resumed.

To accomplish the above object, there is provided according to a first aspect of the present invention mode a shift control apparatus for an automatic transmission of a motor vehicle, including shift control means for selecting one of a plurality of gear positions of the automatic transmission from a predetermined shift pattern, based on a driving condition of the vehicle, and automatically shifting the transmission to the selected gear position, which apparatus comprises: (a) output control member release determining means for determining whether an output control member for controlling an output of an engine has been released; (b) return-to-normal determining means for determining whether a condition under which the shift control means resumes shift control using the predetermined shift pattern is satisfied, wherein the transmission can be shifted up immediately after the shift control using the predetermined shift pattern is resumed; and (c) return-to-normal permitting means for permitting the shift control means to resume the shift control when the output control member release determining means determines that the output control member has been released, if the return-to-normal determining means determines that the condition under which the shift control means resumes the shift control using the predetermined shift pattern is satisfied.

In the above arrangement, where the return-to-normal determining means determines that the condition under which the shift control means resumes the normal shift control is satisfied, the return-to-normal permitting means permits the shift control means to resume the shift control using the predetermined shift pattern when the output control member release determining means determines that the output control member has been released. It is general known that when the output control member or accelerator is released, the transmission is shifted up under the shift control of the shift control means. According to the first aspect of the invention, therefore, the driver will not feel uncomfortable even if the transmission is shifted up immediately after the shift control means resumes the normal shift control.

To accomplish the above object, there is provided according to a second aspect of the present invention a shift control apparatus for an automatic transmission of a motor vehicle, including shift control means for selecting one of a plurality of gear positions of the automatic transmission from a predetermined shift pattern, based on a driving condition of the vehicle, and automatically shifting the transmission to the selected gear position, which comprises: (a) vehicle speed increase determining means for determining whether a vehicle speed has increased; (b) return-to-normal determining means for determining whether a condition under which the shift control means resumes shift control using said predetermined shift pattern is satisfied, wherein the transmission can be shifted up immediately after the shift control using the predetermined shift pattern is resumed; and (c) return-to-normal permitting means for permitting the shift control means to resume the shift control when the vehicle speed increase determining means determines that the vehicle speed has increased, if the return-to-normal determining means determines that the condition under which the shift control means resumes the shift control using the predetermined shift pattern is satisfied.

In the above arrangement, where the return-to-normal determining means determines that the condition under which the shift control means resume the normal shift control is satisfied, the return-to-normal permitting means permits the shift control means to resume the shift control using the predetermined shift pattern when the vehicle speed increase determining means determines that the vehicle speed has increased. It is generally known that shift shocks caused by shifting-up of the transmission may be alleviated or reduced when the vehicle speed increases. According to the second aspect of the invention, therefore, the driver will not feel uncomfortable even if the transmission is shifted up immediately after the shift control means resumes the normal shift control.

Preferably, the shift pattern used in the first and second aspects of the invention is expressed on a two dimensional graph having an axis representing a throttle opening angle (an amount indicating an engine load), and an axis representing a vehicle speed. The shift control means of the first and second aspects of the invention is adapted to select one of the plurality of gear positions from the predetermined shift pattern, based on an actual throttle opening angle and an actual vehicle speed. For example, the shift control means determines that the transmission is to be shifted up when the throttle opening angle is changed to a smaller value.

In a preferred form of the first and second aspects of the present invention, the shift control apparatus further includes drive mode determining means for determining a drive mode of the vehicle, based on at least one drive mode indicating variable that varies in relation to a drive mode desired by a driver, and a shift pattern selecting means for selecting a shift pattern corresponding to a result of determination by the drive mode determining means, from a plurality of shift patterns including an ECONOMY MODE shift pattern, a MEDIUM MODE shift pattern and a SPORTY MODE shift pattern, as the shift pattern used by the shift control means. In this case, the return-to-normal determining means determines whether a condition under which the shift pattern selecting means switches from the SPORTY MODE shift pattern to the MEDIUM MODE shift pattern is satisfied, namely, the condition under which the shift control means resumes the shift control using the predetermined shift pattern is satisfied, depending upon whether the drive mode determining means determines a change from a SPORTY DRIVE mode to a MEDIUM DRIVE mode.

In another preferred form of the first and second aspects of the invention, the shift control apparatus further includes: uphill/downhill running control means for inhibiting a highest gear position from being established when a slope of an uphill road or downhill road on which the vehicle is actually running exceeds a predetermined value, so as to improve drivability on an inclined road. In this case, the return-to-normal determining means determines whether the condition under which the shift control means resumes the shift control using the predetermined shift pattern is satisfied, depending upon whether a condition for cancelling uphill/downhill running control of the uphill/downhill running control means is satisfied.

In a further preferred form of the first and second aspects of the invention, the shift control apparatus further comprises position hold control means for performing position hold control for inhibiting the transmission from being shifted up when sudden closing of a throttle valve is detected, or performing position hold control for shifting down the transmission in earlier timing than that defined by a shift-down line in the shift pattern when a brake is suddenly applied, and holding the gear position to which the transmission is shifted down even after the brake is released. In this case, the return-to-normal determining means determines whether the condition under which the shift control means resumes the shift control using the predetermined shift pattern is satisfied, depending upon whether a condition for cancelling the position hold control of said position hold control is satisfied.

Preferably, the shift control apparatus according to the first aspect of the invention further includes time lapse monitoring means for determining whether a predetermined time has elapsed after the return-to-normal determining means determines that the condition under which the shift control means resumes the shift control using the predetermined shift pattern is satisfied. In this case, the return-to-normal means permits the shift control means to resume normal shift control using the predetermined shift pattern, when the time lapse monitoring means determines that the predetermined time has elapsed after the condition to resume the normal shift control is satisfied, and the output control member release determining means determines that the output control member has been released.

In another preferred form of the first aspect of the invention, the output control member release determining means determines that the output control member has been released, when a releasing speed of the output control member is not smaller than a predetermined value, and a released amount of the output control member is not smaller than a predetermined value. Alternatively, the output control member release determining means may determine that the output control member has been released, when an operated amount of the output control member is not smaller than a predetermined amount, and a releasing speed of the output control member is not smaller than a predetermined value.

Preferably, the shift control apparatus according to a second aspect of the present invention further includes vehicle turn determining means for determining whether the vehicle is turning; and return-to-normal inhibiting means for inhibiting the return-to-normal permitting means from permitting the shift control means to resume the shift control, when the vehicle turn determining means determines that the vehicle is turning. In this arrangement, the transmission is prevented from being shifted up during turning of the vehicle, assuring improved running stability during vehicle turning.

In another preferred form of the second aspect of the invention, the shift control apparatus further includes vehicle braking determining means for determining whether the vehicle is being braked. In this case, the return-to-normal permitting means is prevented from determining, based on an increase in the vehicle speed, whether the shift control means resumes the shift control using the predetermined shift pattern, if the vehicle braking determining means determines that the vehicle is being braked.

BRIEF DESCRIPTION OF THE DRAWINGS

FIG. 2 is a graph indicating combinations of gear positions of the automatic transmission and operating states of solenoid-operated values or frictional coupling devices, for shifting the transmission to a selected one of the gear positions;

DESCRIPTION OF THE PREFERRED EMBODIMENTS

Figure 1:
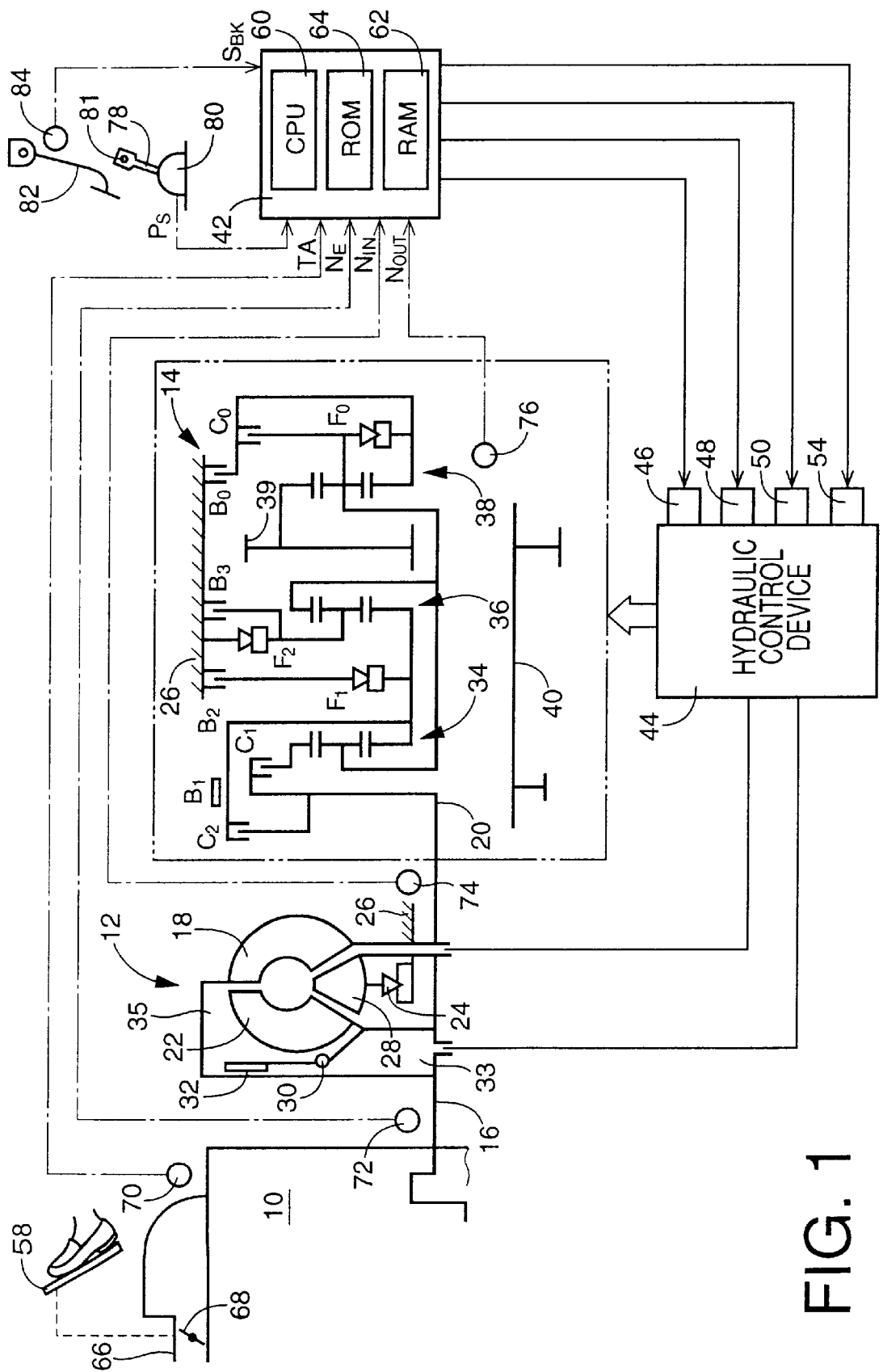
FIG. 1 is a view showing a shift control apparatus for an automatic transmission of a motor vehicle according to one embodiment of the present invention.

One embodiment of the present invention will be described in detail referring to the drawings.

FIG. 1 shows an automatic transmission of a motor vehicle and a shift control apparatus. In FIG. 1, a drive force or power generated from an engine 10 of the vehicle is transmitted to drive wheels that are not illustrated, through a torque converter 12, automatic transmission 14, and a differential gear device and axles that are not illustrated.

The torque converter 12 includes: a pump impeller 18 connected to a crankshaft 16; a turbine impeller 22 which is connected to an input shaft 20 of the automatic transmission 14 and to which a drive force is transmitted through a fluid from the pump impeller 18; a stationary impeller 28 fixed to a stationary housing 26 through a one-way clutch 24; and a lock-up clutch 32 connecting the pump and turbine impellers 18, 22 through a damper 30. This lock-up clutch 32 is brought into an engaged state by a difference between hydraulic pressures in a releasing oil chamber 33 and an engaging oil chamber 35.

The automatic transmission 14 includes three single pinion planetary gear sets 34, 36, 38 coaxially arranged on a common axis, the above-indicated input shaft 20, and a counter shaft (output shaft) 40 disposed between an output gear 39 that is rotated with a ring gear of the planetary gear set 38, and the above-indicated differential gear device, for transmitting the drive force. The planetary gear sets 34, 36, 38 include some elements that are integrally connected to each other, and some elements that are selectively connected to each other through three clutches $C_0$, $C_1$ and $C_2$. The planetary gear sets 34, 36, 38 include some elements which are selectively fixed to the housing 26 through four brakes $B_0$, $B_1$, $B_2$, $B_3$, and some elements which are selectively connected to each other or fixed to the housing 26 through three one-way clutches $F_0$, $F_1$ and $F_2$, depending upon their rotating directions.

The clutches $C_0$, $C_1$, $C_2$ and brakes $B_0$, $B_1$, $B_2$, $B_3$ may be multiple-disk clutches, and band brakes each of which has a single band or two bands whose winding directions are opposite to each other. These clutches and brakes are operated by respective hydraulic actuators (not shown), which are controlled by a hydraulic control device 44 according to control signals received from an electronic control device 42 which will be described. With the operations of the hydraulic actuators controlled by the hydraulic control device 44, the automatic transmission 14 is automatically shifted to one of four forward/drive positions and one rear-drive position having different speed ratio values γ(=ratio of the speed of the input shaft 20 to the speed of the counter shaft 40), as indicated in FIG. 2. In FIG. 2, "1st", "2nd", "3rd" and "O/D (overdrive)" respectively represent a first-speed gear position, a second-speed gear position, a third-speed gear position and a fourth-speed gear position on the forward drive side, and the above-indicated speed ratio successively decreases from the first-speed gear position to the fourth-speed gear position. Since the torque converter 12 and the automatic transmission 14 are symmetrical with respect to their axis, the lower side of the rotary axis of the input shaft 20 and the upper side of the rotary axis of the counter shaft 40 are not shown in FIG. 1 in the interest of simplification.

The hydraulic control device 44 includes a shift control hydraulic circuit for shifting the automatic transmission 14, and a lock-up clutch control hydraulic circuit for selectively engaging and releasing the lock-up clutch 32. The shift control hydraulic circuit includes a first solenoid-operated valve 46 and a second solenoid-operated valve 48 which are turned on and off by a solenoid No. 1 and a solenoid No. 2, respectively. The clutches and brakes are selectively engaged by a selected combination of the operating states of the first and second solenoid-operated valves 46, 48, as indicated in FIG. 2, so as to establish a selected one of the first-speed to fourth-speed gear positions.

The lock-up clutch control hydraulic circuit includes a third solenoid-operated valve 50, and a linear solenoid valve 54. The third solenoid-operated valve 50 generates a pilot pressure for controlling a lock-up clutch switching valve (not shown), which has a releasing position for releasing the lock-up clutch 32 and an engaging position for engaging the lock-up clutch 32. The linear solenoid valve 54 is controlled by a drive current supplied from the electronic control device 42, so as to apply a slip control pressure to a slip control valve (not shown) which is adapted to regulate a pressure difference ΔP between the hydraulic pressures in the releasing and engaging oil chambers 33, 35 of the lock-up clutch 32, for thereby controlling the amount of slip of the lock-up clutch 32.

The electronic control device 42 is a so-called microcomputer incorporating CPU 60, RAM 62, ROM 64, and input and output interfaces (not shown). The control device 42 is adapted to receive output signals of various sensors or detectors, which include: a throttle sensor 70 for detecting an opening angle TA of a throttle valve 68 disposed in an intake pipe 66 of the engine 10; an engine speed sensor 72 for detecting a rotating speed of the engine 10; an input shaft speed sensor 74 for detecting a rotating speed of the input shaft 20 of the automatic transmission 14; a vehicle speed sensor 76 for detecting a rotating speed of the counter shaft 40 of the automatic transmission 14 so as to detect a vehicle speed V; a shift position sensor 80 for detecting a currently selected one of operated positions "L", "S", "D", "N", "R" and "P" of a shift lever 78; an O/D OFF switch 81 for inhibiting the overdrive gear position, namely, the fourth-speed gear position from being established, and selecting one of the first- to third-speed gear positions; and a brake switch 84 for detecting an operation of a brake pedal 82. From these sensors and switches, the electronic control device 42 receives a signal representing the opening angle TA of the throttle valve, a signal representing the engine speed $N_E$, a signal representing the rotating speed $N_{IN}$ of the input shaft, a signal representing the rotating speed $N_{OUT}$ of the output shaft (counter shaft 40), a signal representing the operated position $P_S$ of the shift lever 78, a signal representing an ON state of the OD/OFF switch 81, and a signal $S_{BK}$ representing the operation of the brake pedal 82. The throttle valve 68 is mechanically linked with an accelerator pedal 58 which serves as an output control member, such that the throttle opening angle TA increases with an increase in the amount of depression of the accelerator pedal 58. Thus, the throttle sensor 70 substantially detects an operated amount Acc (namely, output control amount) of the accelerator pedal 58.

The CPU 60 of the electronic control device 42 operates to process the input signals as described above, according to control programs stored in advance in the ROM 64, so as to perform shift control, lock-up clutch control, drive mode determining control, uphill/downhill running control and position hold control, for example. Thus, in the present embodiment, the electronic control device 42 functions as a shift control device, lock-up clutch control device, drive mode determining control device, uphill/downhill running control device, and a position hold control device, for example.

Figure 3:
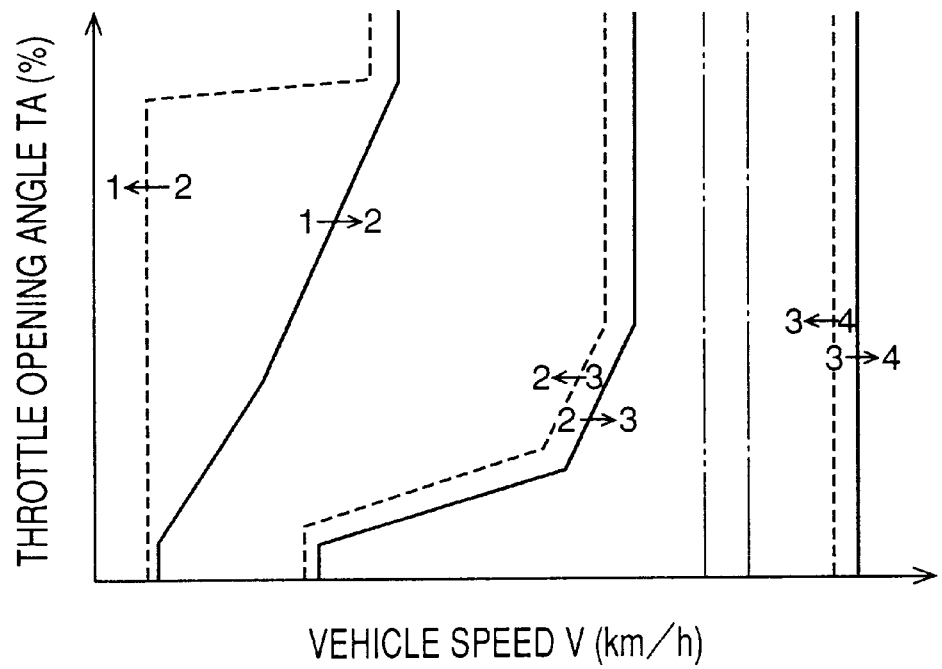
FIG. 3 is a shift pattern used in the shift control apparatus of FIG. 1, which shift pattern is selected when a SPORTY DRIVE mode is desired by a vehicle operator or driver.
Figure 4:
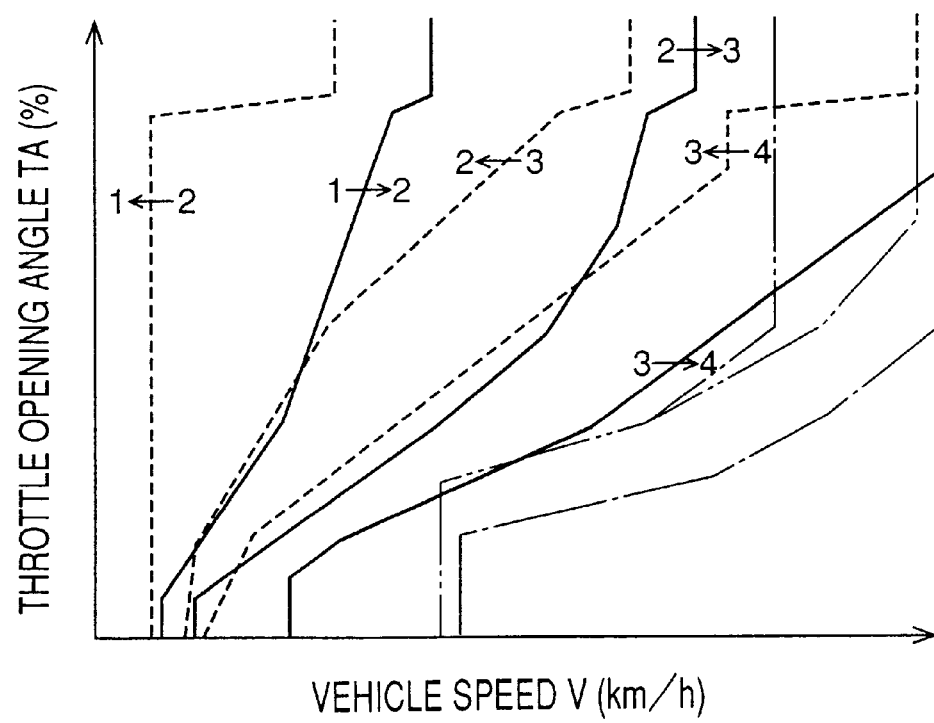
FIG. 4 is a shift pattern used in the shift control apparatus of FIG. 1, which shift pattern is selected when a MEDIUM (NORMAL) DRIVE mode is desired by the driver.
Figure 5:
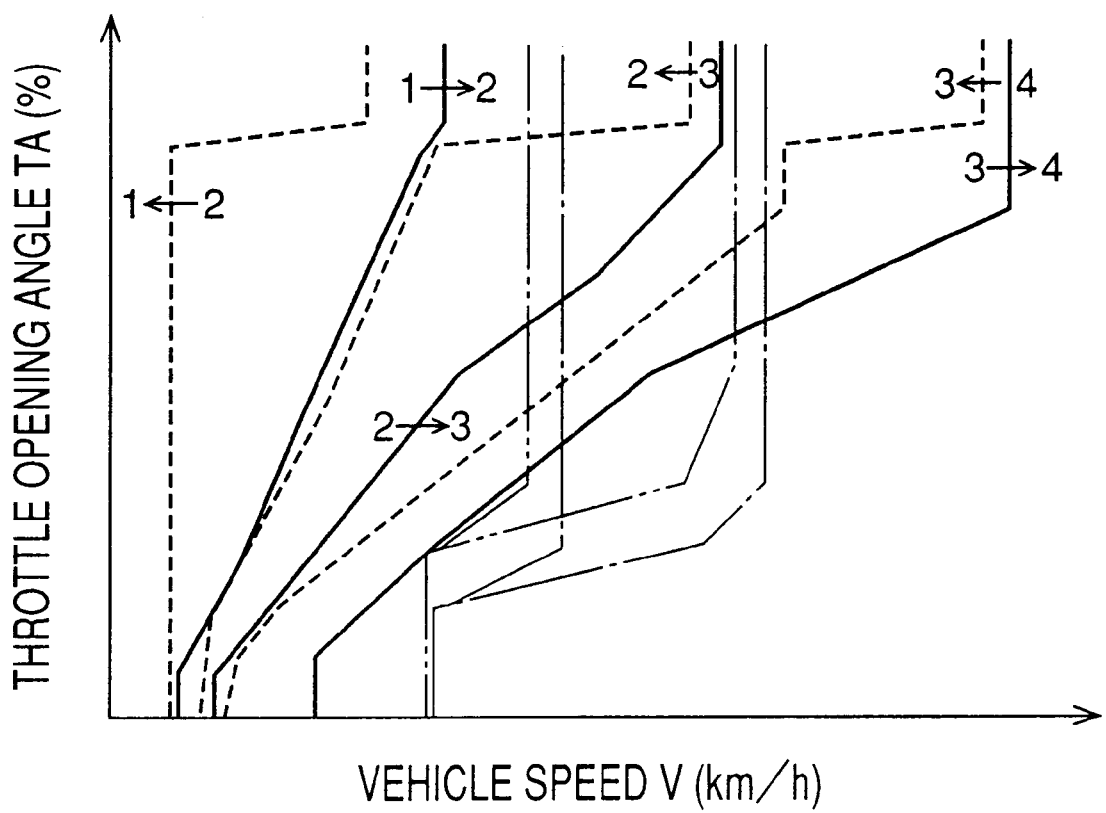
FIG. 5 is a shift pattern used in the shift control apparatus of FIG. 1, which shift pattern is selected when a ECONOMY DRIVE mode is desired by the driver.

In the shift control or lock-up clutch control of the electronic control device 42, a shift pattern corresponding to a vehicle drive mode desired by the vehicle operator or driver is selected from a plurality of shift patterns stored in the ROM 64, namely, a SPORTY MODE shift pattern shown in FIG. 3, a MEDIUM MODE shift pattern (normal shift pattern or basic shift pattern used for normal running of the vehicle), and an ECONOMY MODE shift pattern shown in FIG. 5. The automatic transmission 14 is shifted up or down to an appropriate forward-drive position, and the lock-up clutch 32 is engaged or released, on the basis of the actually detected vehicle speed V and throttle opening angle TA, and according to the selected shift pattern. For example, if a point determined by the actually detected vehicle speed V and throttle opening angle TA in the normal shift pattern of FIG. 4 passes across a shift-up or shift-down boundary line, a command to shift up or shift down the automatic transmission is generated. Then, the first solenoid-operated valve 46 and second solenoid-operated valve 48 shown in FIG. 1 are driven so as to establish the gear position to which the transmission to be shifted, or the third solenoid-operated valve 50 and linear solenoid valve 54 are driven so as to appropriately engage or release the lock-up clutch 32.

In FIGS. 3, 4 and 5, solid lines indicate the shift-up boundary lines, and broken lines indicate the shift-down boundary lines. One-dot chain lines indicate lock-up clutch engaging boundary lines, while two-dot chain lines indicate lock-up clutch releasing boundary lines. The shift-up and shift-down boundary lines of the SPORTY MODE shift pattern of FIG. 3 are determined so that the shifting actions of the automatic transmission take place at higher engine speeds, as compared with the boundary lines shown in FIG. 4. Conversely, the boundary lines of the ECONOMY DRIVE MODE shift pattern of FIG. 5 are determined so that the shifting actions take place at lower engine speeds, compared to those of FIG. 4. Each of the shift patterns shown in FIGS. 3, 4 and 5 is expressed on a two-dimensional graph having an axis representing the throttle opening angle TA (a quantity indicating an engine load) and an axis representing the vehicle speed V. The shift-up actions are determined by operating the throttle valve so as to reduce the throttle opening angle.

Figure 6:
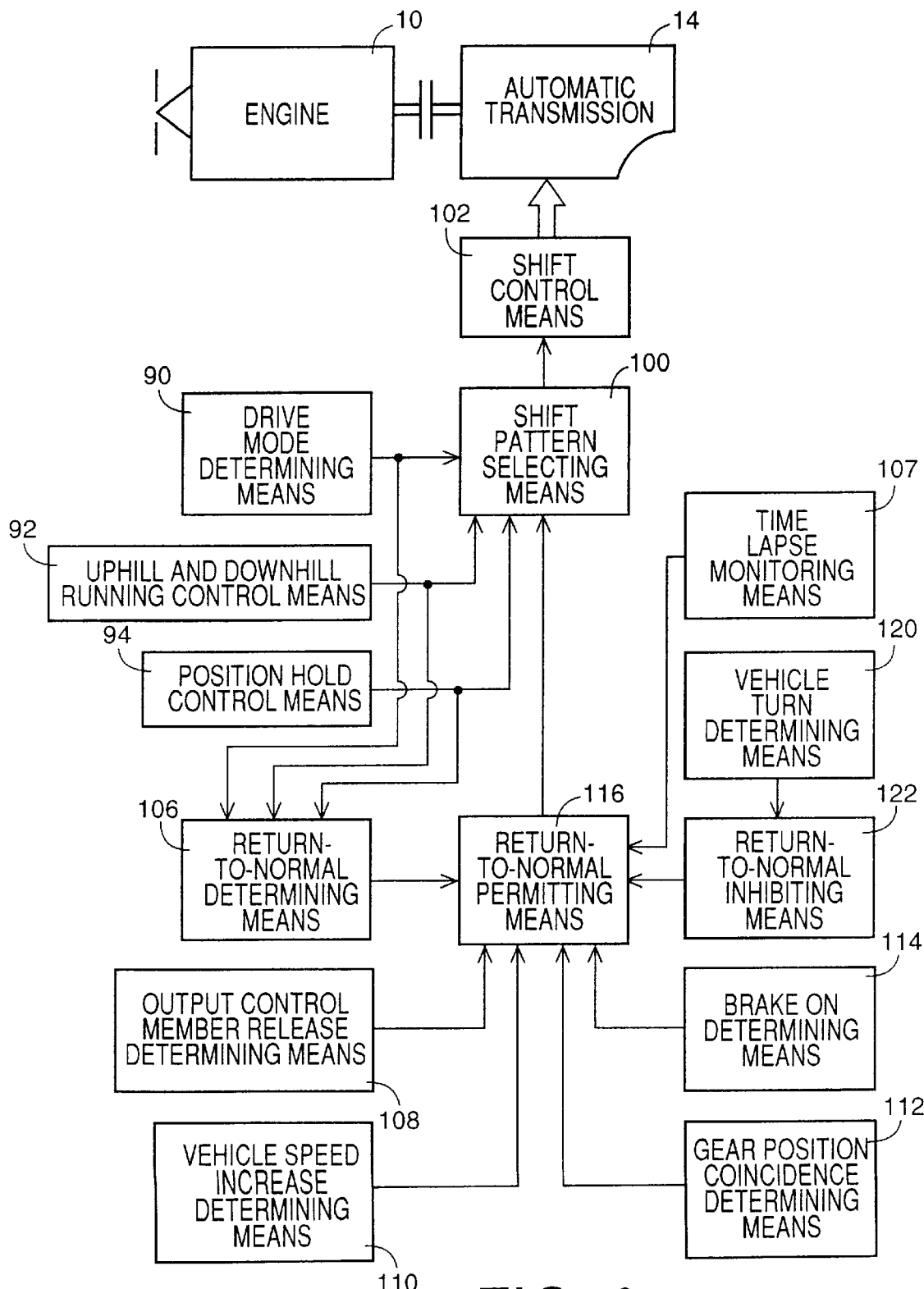
FIG. 6 is a functional block diagram explaining principal control operations of an electronic control device of FIG. 1.

FIG. 6 is a functional block diagram explaining principal control functions of the electronic control device 42. In this figure, drive mode determining means 90 estimates a desired drive mode of the vehicle, based on drive mode indicating variables, such as an operated amount of the accelerator pedal during a starting period of the vehicle, coasting state during running of the vehicle, variations in the throttle opening angle TA during running of the vehicle, and manner of operating the shift lever 78 during running of the vehicle, according to predetermined expressions, neuro arithmetic expressions provided by a neural network, or fuzzy arithmetic expressions. For example, the drive mode determining means 90 determines that the vehicle is in the SPORTY DRIVE mode in which high output running is desired, when a neural output value $NN_{OUT}$ calculated based on the drive mode indicating variables according to a predetermined neuro arithmetic expression exceeds a predetermined SPORTY MODE criterial value $NN_{SPORT}$. If the output value $NN_{SPORT}$ is equal to or smaller than the SPORTY MODE criterial value $NN_{SPORT}$ but exceeds a MEDIUM MODE criterial value $NN_{NORM}$ the drive mode determining means 90 determines that the vehicle is in the MEDIUM (NORMAL) DRIVE mode in which medium or normal running is desired. If the output value $NN_{OUT}$ is equal to or smaller than the MEDIUM MODE criterial value $NN_{NORM}$, the determining means 90 determines that the vehicle is in the ECONOMY DRIVE mode in which low output running is desired. Based on the result of the determination, an appropriate one of SPORTY MODE flag $X_{SPORT}$ indicative of a desire to establish the SPORTY DRIVE mode, ECONOMY MODE flag $X_{ECO}$ indicative of a desire to establish the ECONOMY DRIVE mode, and MEDIUM (NORMAL) MODE flag $X_{NORM}$ indicative of a desire to establish the MEDIUM (NORMAL) drive mode is set to "1".

The uphill/downhill running control means 92 detects the slope of the road surface by comparing an acceleration on a flat road and an actual acceleration based on the throttle opening angle TA, and performs the uphill/downhill running control to inhibit the highest gear position (fourth-speed gear position in the present embodiment) where the vehicle is running on an uphill road or a downhill road whose slope is equal to or greater than a predetermined value. This uphill/downhill running control means 92 inhibits the highest gear position from being established, by causing a shift pattern selecting means 100 to select a shift pattern which does not include a shift-up boundary line (3→4 shift-up line in the present embodiment) used upon shifting-up to the highest gear position.

The position hold control means 94 performs position hold control for detecting that the throttle valve 68 is abruptly or suddenly closed to its idle position (fully closed position), for example, and inhibiting shifting-up of the gear position of the automatic transmission 14. The position hold control means 94 also performs position hold control for shifting down the transmission in earlier timing than the shift-down boundary line when the brakes are suddenly applied, and holding the resulting gear position even after the brakes are released. To inhibit the transmission from being shifted up from the gear position held before the sudden closing of the throttle valve 68 or from the gear position to which the transmission is shifted down upon sudden braking, the position hold control means 94 inhibits shift control means 102 from shifting up the transmission, or causing the shift pattern selecting means 100 to select a shift pattern that does not include shift-up boundary lines.

The shift pattern selecting means 100 is adapted to establish the gear change ratio of the automatic transmission 14, by selecting an appropriate shift pattern used by the shift control means 102, based on the drive mode determined by the drive mode determining means 90. Namely, the shift pattern selecting means 100 selects a shift pattern corresponding to the drive mode determined by the drive mode determining means 90, from a plurality of shift patterns shown in FIGS. 3, 4 and 5 which are stored in advance in the ROM 64. If the SPORTY DRIVE mode is estimated by the drive mode determining means 90, for example, the SPORTY MODE shift pattern of FIG. 3 is selected. If the ECONOMY DRIVE mode is estimated, on the other hand, the ECONOMY MODE shift pattern of FIG. 5 is selected. If the MEDIUM DRIVE mode is estimated, the shift pattern selecting means 100 selects the MEDIUM MODE shift pattern of FIG. 4 having intermediate characteristics between those of the SPORTY MODE shift pattern and those of the ECONOMY MODE shift pattern.

If the uphill/downhill running control means 92 determines that uphill running control or downhill running control is to be performed, the shift pattern selecting means 100 preferably selects a shift pattern which does not include a 3→4 shift-up boundary line so as not to establish the fourth-speed gear position, as the shit pattern used by the shit control means 102. Where the position hold control means 94 determines that the position hold control is to be performed, the shift pattern selecting means 100 preferably selects a shift pattern having no shift-up boundary lines, as the shift pattern used by the shift control means 102.

The shift control means 102 selects one of the gear positions to which the automatic transmission is to be shifted, from the shift pattern selected by the above-indicated shift pattern selecting means 100 from a plurality of shift patterns stored in the ROM 64 as shown in FIGS. 3, 4, 5, based on the actual vehicle V detected by the vehicle speed sensor 76, and the actual throttle opening angle TA detected by the throttle sensor 70. The sift control means 102 then generates shift control signals to the solenoid-operated valves 46, 48, 50 based on the above determination, so as to establish the selected gear position of the automatic transmission 14.

The return-to-normal determining means 106 determines whether there are conditions under which the shift pattern selecting means 100 can change the SPORTY MODE shift pattern of FIG. 3 to the MEDIUM MODE shift pattern (shift pattern for normal running) of FIG. 4, namely, whether the conditions under which the shift control means 102 can resume the shift control using the shift pattern of FIG. 4 are satisfied or not, depending upon whether the drive mode determining means 90 determines that the SPORTY DRIVE mode is to be changed to the MEDIUM DRIVE mode, for example. The return-to-normal determining means 106 also determines whether the conditions under which the shift control means 102 can resume the shift control using the shift pattern of FIG. 4 are satisfied or not, depending upon whether conditions of cancelling the uphill/downhill running control by the uphill/downhill running control means 92 are satisfied. Further, the return-to-normal determining means 106 determines whether the conditions under which the shift control means 102 can resume the shift control using the shift pattern of FIG. 4 are satisfied, depending upon whether conditions of cancelling the position hold control by the position hold control means 94 are satisfied.

Preferably, a time lapse monitoring means 107 is provided for determining whether a predetermined time $C_3$ has elapsed after the return-to-normal determining means 105 determines that the conditions under which the shift pattern selecting means 100 can switch from the SPORTY MODE shift pattern of FIG. 3 to the MEDIUM MODE shift pattern (shift pattern for normal running) of FIG. 4 are satisfied, namely, the conditions under which the shift control means 102 can resume the shift control using the MEDIUM MODE shift pattern of FIG. 4 are satisfied, based on the determination of the drive mode determining means 90 as to whether the SPORTY DRIVE mode is to be switched to the MEDIUM DRIVE mode. This predetermined value $C_3$ is set to a time required to bring the neural output value $NN_{OUT}$ that changes in association with a releasing operation of the accelerator pedal 58, to a stable condition.

Output control member release determining means 108 determines whether the accelerator pedal 58 for controlling the output of the engine 10 has been released, based on a signal from the throttle sensor 70. For example, the output control member release determining means 108 determines that the accelerator pedal 58 has been released when a releasing speed $|dTA/dt|$ of the accelerator pedal 58 is equal to or higher than a predetermined value, and the releasing amount of the accelerator pedal 58, namely, pedal returning width $W_{TA}$ measured from a point where the pedal 58 starts being released is equal to or greater than a predetermined value. Alternatively, the output control member release determining means 108 determines that the accelerator pedal 58 has been released when the operating amount TA of the accelerator pedal 58 is equal to or greater than a predetermined value, and the releasing speed $|dTA/dt|$ is equal to or higher than a predetermined value.

Vehicle speed increase determining means 110 determines whether the vehicle speed V has increased based on a signal from the vehicle sensor 76, after the return-to-normal determining means 106 determines that the return-to-normal conditions under which the shift control means 102 resumes the shift control using the shift pattern of FIG. 4 are satisfied. Gear position coincidence determining means 112 estimates the gear position to be established after returning to the normal running, based on the actual throttle opening angle TA and vehicle speed V, and the MEDIUM MODE shift pattern of FIG. 4 used after the return and compares the estimated gear position with the actual gear position, so as to determine whether the gear position held at the time when the return-to-normal determining means 106 determines that the conditions for the shift control means 102 to resume the shift control using the shift pattern of FIG. 4 are satisfied coincides with the gear position to be established after returning to the normal drive mode. Brake ON determining means 114 determines the operated state of the brake pedal 82 based on a signal from the brake switch 84.

Where the return-to-normal determining means 106 determines that the conditions under which the shift control means 102 resumes the shift control using the MEDIUM MODE shift pattern of FIG. 4 are satisfied, return-to-normal permitting means 116 permits the shift control means 102 to resume the shift control using the MEDIUM MODE shift pattern, when the releasing operation of the accelerator pedal 58 is determined by the output control member release determining means 108. Where the return-to-normal determining means 106 determines that the conditions under which the shift control means 102 resumes the shift control using the MEDIUM MODE shift pattern of FIG. 4 are satisfied, the return-to-normal permitting means 116 permits the shift control means 102 to resume the shift control using the MEDIUM MODE shift pattern when the vehicle speed increase determining means 110 determines that the vehicle speed V has increased since the determination by the return-to-normal determining means 106. Where the return-to-normal determining means 106 determines that the conditions under which the shift control means 102 resumes the shift control using the MEDIUM MODE shift pattern of FIG. 4 are satisfied, the return-to-normal permitting means 116 permits the shift control means 102 to resume the shift control using the MEDIUM MODE shift pattern when the gear position coincidence determining means 112 determines that the current gear position coincides with the gear position to be established after returning to the normal drive mode. Further, the return-to-normal permitting means 116 does not permit returning to the shift control using the MEDIUM MODE shift pattern due to an increase of the vehicle speed V, if the brake ON determining means 114 determines that the brakes are being applied.

In the case where the accelerator pedal 58 is released while the vehicle is running in the SPORTY DRIVE mode in the third-speed gear position, the return-to-normal permitting means 116 permits the shift control means 102 to resume the shift control using the MEDIUM MODE shift pattern, namely, permits shifting-up to the fourth-speed gear position, if the output control member release determining means 102 determines the releasing operation of the accelerator pedal 58 after a predetermined time $C_3$ elapses since the return-to-normal determining means 102 determines that the conditions under which the shift control means 102 resumes the shift control using the MEDIUM shift pattern of FIG. 4 are satisfied.

Vehicle turn determining means 120 determines whether the vehicle is turning or not, depending upon whether the steering or rudder angle of the steering wheel or drive wheels, lateral acceleration (lateral G), corner R and others detected by sensors (not shown) exceed predetermined criterial values. When the vehicle turn determining means 120 determines that the vehicle is turning, return-to-normal inhibiting means 122 inhibits the shift control means 102 from resuming the shift control using the MEDIUM MODE shift pattern.

Figure 7:
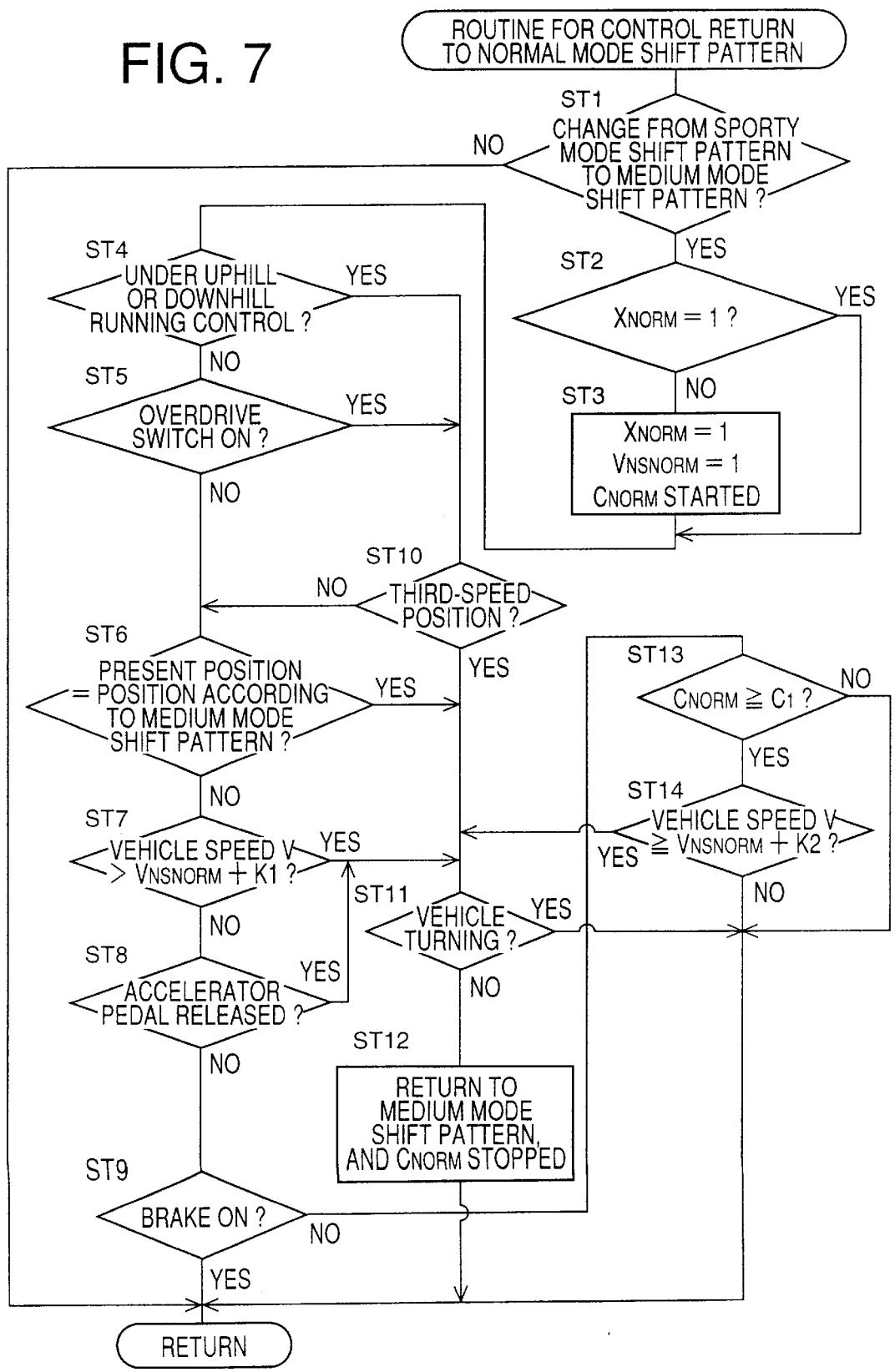
FIG. 7 is a flow chart explaining a return-to-normal control routine to return to a NORMAL MODE pattern, as a principal control operation of the electronic control device of FIG. 1.
Figure 8:
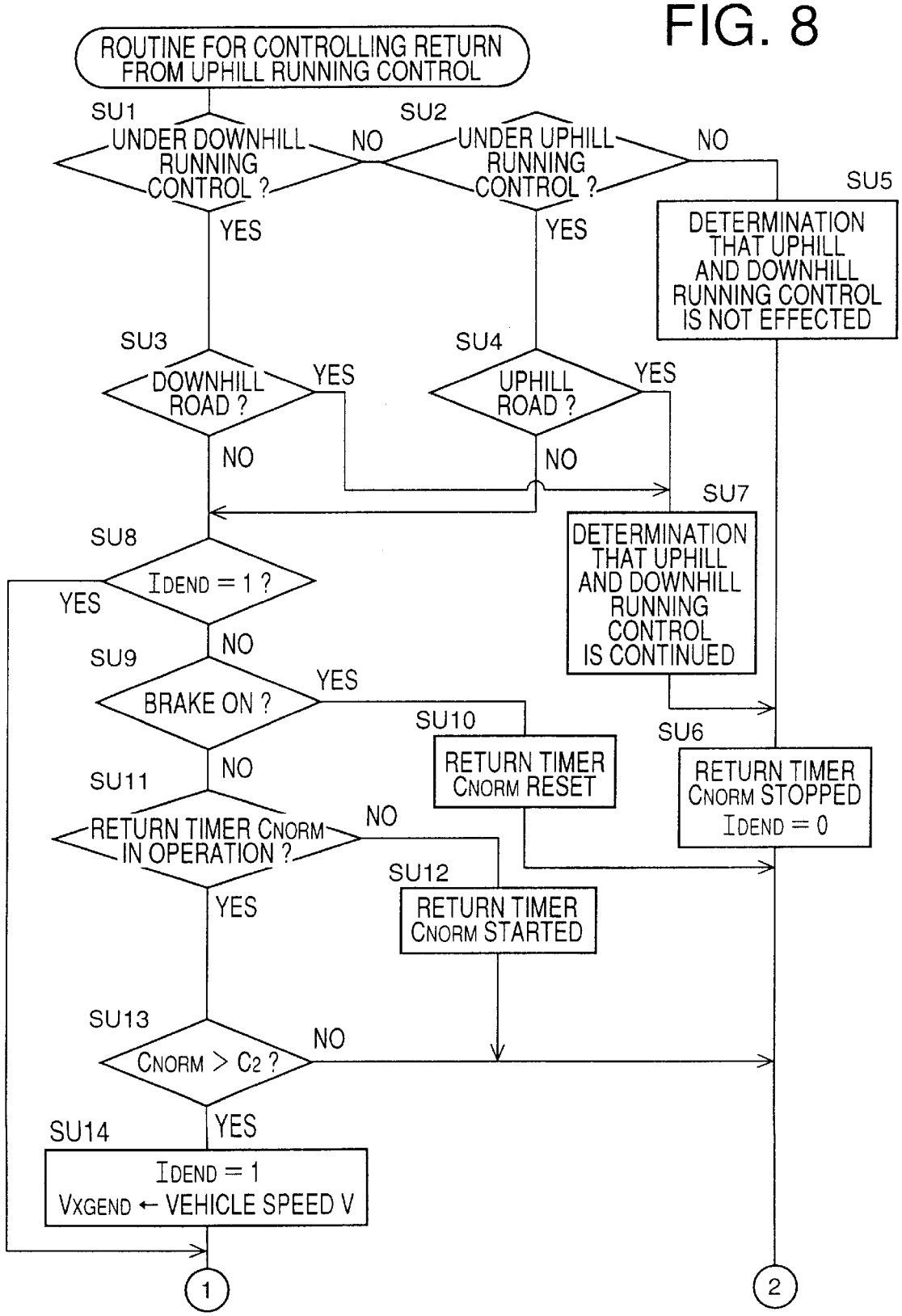
FIG. 8 is a flow chart explaining, along with that of FIG. 9, a return-to-normal control routine to return from uphill/downhill running control, as a principal control operation of the electronic control device of FIG. 1.
Figure 9:
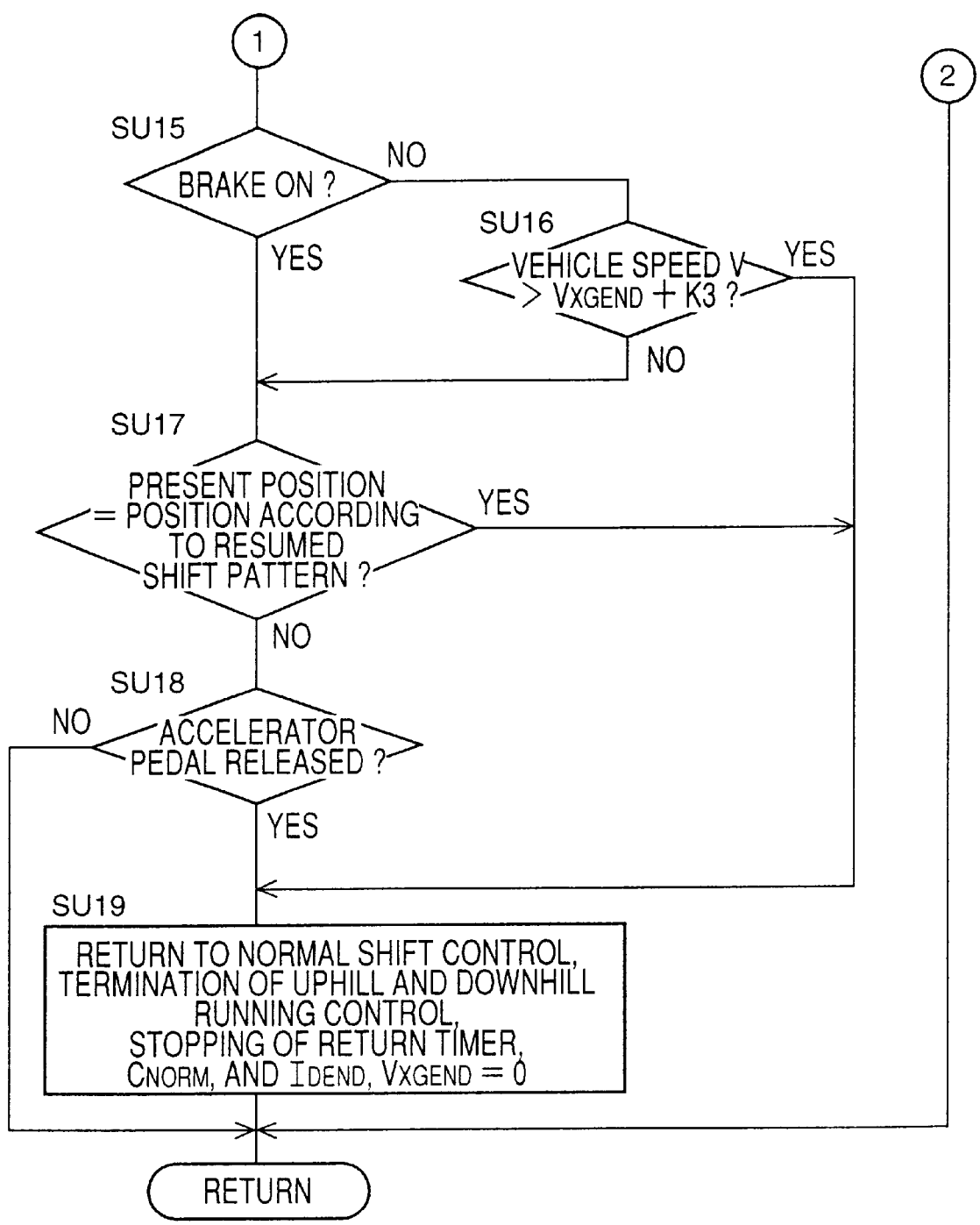
FIG. 9 is a flow chart explaining, along with that of FIG. 8, the return-to-normal control routine to return from the uphill/downhill running control, as a principal control operation of the electronic control device of FIG. 1.
Figure 10:
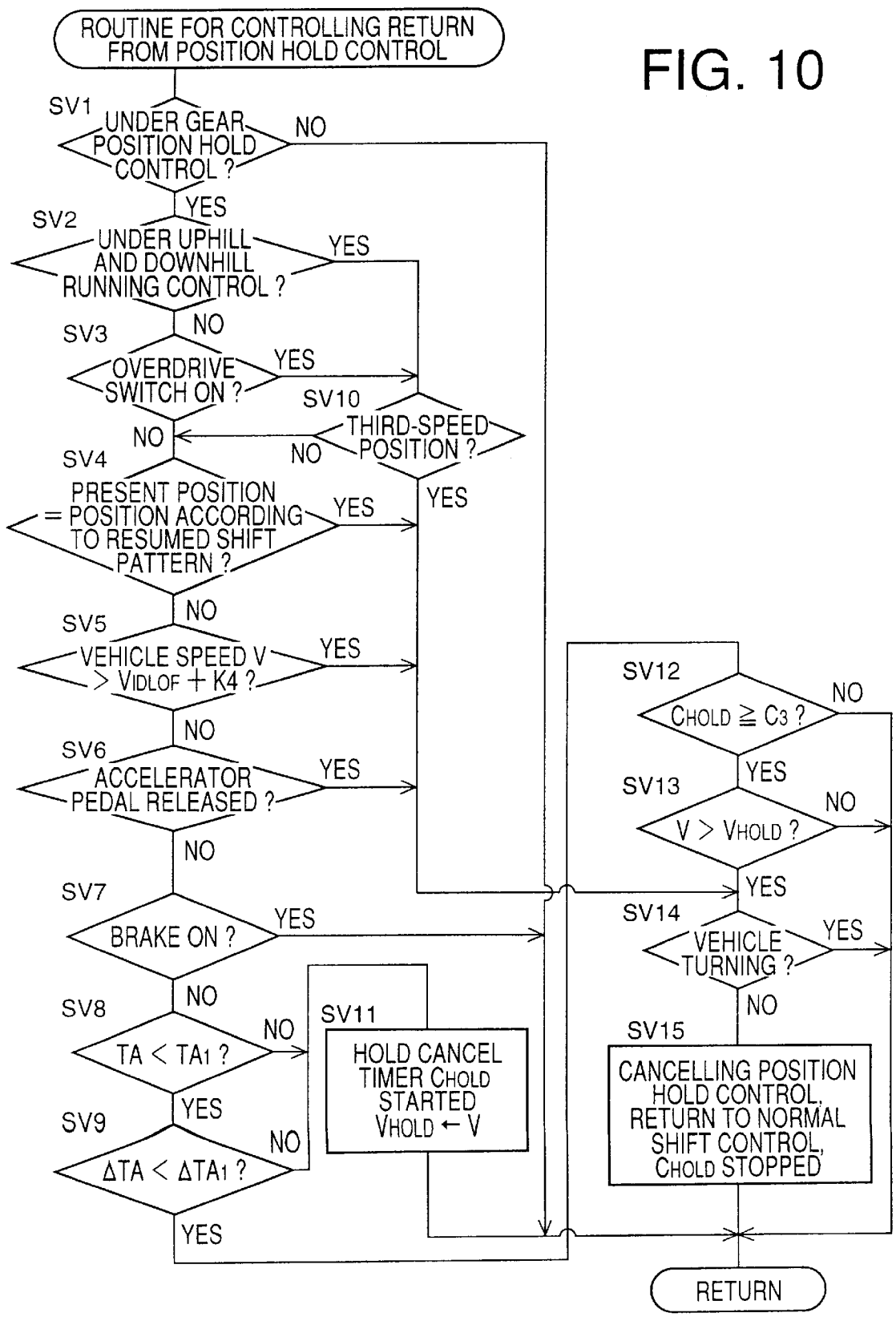
FIG. 10 is a flow chart explaining a return-to-normal control routine to return from position hold control, as a principal control operation of the electronic control device of FIG. 1.

FIG. 7, FIG. 8, FIG. 9 and FIG. 10 are flow charts explaining principal control operation of the electronic control device 42. FIG. 7 shows return-to-normal control for returning from the SPORTY MODE shift pattern to MEDIUM MODE shift pattern (NORMAL MODE shift pattern), and FIGS. 8 and 9 show return-to-normal control for returning from the uphill/downhill running control. FIG. 10 shows return-to-normal control for returning from the position hold control.

In FIG. 7, in step ST1 ("step" will be hereinafter omitted), the drive mode determining means 90 determines whether the SPORTY DRIVE mode is to be changed to the MEDIUM DRIVE mode, so as to determine whether the SPORTY MODE shift pattern (FIG. 3) is to be changed to the MEDIUM MODE shift pattern (FIG. 4), namely, whether the shift control means 102 resumes the shift control using the MEDIUM MODE shift pattern. If a negative decision is obtained in ST1, the present routine is terminated. If an affirmative decision is obtained, ST2 is executed to determine whether the content of the MEDIUM MODE flag $X_{NORM}$ is "1" or not.

Since a negative decision is initially obtained in ST2, ST3 is executed to set the content of the MEDIUM MODE flag $X_{NORM}$ to "1", and store the current vehicle speed V as a return-to-normal decision time vehicle speed $V_{SNORM}$. After a return-to-normal timer $C_{NORM}$ starts operating to count elapsed time since the decision to return to the normal drive mode was made, ST4 is executed. Once the content of the MEDIUM MODE flag $X_{NORM}$ is set to "1", ST2 is directly followed by ST4.

In step ST4, it is determined whether the vehicle is under uphill/downhill running control of the uphill/downhill running control means 92. If a negative decision is obtained in ST4, ST5 is executed to determine whether the O/D OFF switch 81 for inhibiting the highest gear position, namely, the fourth-speed gear position, from being established is currently placed in the ON state or not. If an affirmative decision is obtained either in ST4 or ST5, ST10 is executed to determine whether the automatic transmission is currenty placed in the 3rd -speed gear position. If an affirmative decision is obtained in ST10, ST11 is executed to determine whether the vehicle is turning or not. If an affirmative decision is obtained in ST11, the present routine is terminated. If a negative decision is obtained, ST12 is then executed to return to the MEDIUM MODE shift pattern, and stop the counting operation of the return-to-normal timer $C_{NORM}$.

If negative decisions are obtained both in ST4 and ST5, or a negative decision is obtained in ST10, ST6 is executed to determine whether the current gear position coincides with the gear position to be established after returning to the normal drive mode, namely, the gear position determined by the current throttle opening TA and vehicle speed V, and the MEDIUM MODE shift pattern. If a negative decision is obtained in ST6, ST7 is executed to determine whether the vehicle speed V is larger than a value obtained by adding a predetermined value $K_1$ to the return-to-normal decision time vehicle speed $V_{SNORM}$, namely, whether the vehicle speed V has increased after the decision to return to the normal drive mode was made. If a negative decision is obtained in ST7, ST8 is executed to determine whether the accelerator pedal 58 has been released or not.

If an affirmative decision is obtained in any one of ST6, ST7, ST8, ST12 is executed to return to the MEDIUM MODE shift pattern provided that ST11 determines that the vehicle is not turning. If negative decisions are obtained in all of ST6, ST7, ST8, it is determined in ST9 whether the brake pedal 82 is being operated or depressed to apply the brakes, based on a signal from the brake switch 84. If an affirmative decision is obtained in ST9, the present routine is terminated. If a negative decision is obtained, ST13 is executed to determine whether the content of the return-to-normal timer $C_{NORM}$ is equal to or larger than a criteria value $C_1$. The criterial value $C_1$ is a value set for returning to the MEDIUM MODE shift pattern with a relatively slow releasing operation of the accelerator pedal 58 when a sufficiently long time has elapsed since the return-to-normal decision was made in ST1.

If a negative decision is obtained in ST13, the present routine is terminated. If an affirmative decision is obtained in this step, ST14 is executed to determine whether the vehicle speed V is larger than a value obtained by adding a predetermined value $K_2$ to the return-to-normal decision time vehicle speed $V_{NSNORM}$, namely, whether the vehicle speed V has increased since the return-to-normal decision was made. The predetermined value $K_2$ is a criterial value used for determining an increase in the vehicle speed, and is set to a value smaller than the above-indicated predetermined value $K_1$. If a negative decision is obtained in step ST14, the present routine is terminated. If an affirmative decision is obtained in this step, ST12 is executed to return to the MEDIUM MODE shift pattern provided that ST11 determines that the vehicle is not turning.

As described above, in the present embodiment in which the return-to-normal control of FIG. 7 is implemented, there are provided: the drive mode determining means 90 for determining the drive mode of the vehicle, based on drive mode indicating variables which vary with the driver's desire for a particular drive mode; and the shift pattern selecting means 100 for selecting one shift pattern from a plurality of shift patterns including the ECONOMY MODE shift pattern, MEDIUM (NORMAL) MODE shift pattern, and SPORTY MODE shift pattern, as the shift pattern used by the shift control means 102, such that the selected shift pattern corresponds to the result of determination of the drive mode determining means 90. The return-to-normal determining means 106 (ST1) determines whether conditions under which the shift pattern selecting means 100 can switch from the SPORTY MODE shift pattern to the MEDIUM MODE shift pattern (a predetermined shift pattern) are satisfied or not, namely, the return-to-normal conditions under which the shift control means 102 can resume the shift control using the MEDIUM (NORMAL) MODE shift pattern are satisfied or not, depending upon whether the drive mode determining means 90 determines that the SPORTY drive mode is to be changed to the MEDIUM drive mode. It is generally known that when the accelerator pedal 58 is released, a shift-up action occurs in the shift control of the shift control means 102. Where the return-to-normal determining means 106 (ST1) determines that the conditions under which the shift control means 102 resumes the shift control using the MEDIUM MODE shift pattern are satisfied, the return-to-normal permitting means 116 (ST12) permits the shift control means 102 to resume the shift control using the MEDIUM MODE shift pattern when the output control member release determining means 108 (ST8) determines the releasing operation of the accelerator pedal 58. In this arrangement, the driver will not feel uncomfortable at all even if a shift-up action occurs immediately after the shift control means 102 resumes the shift control using the MEDIUM MODE shift pattern.

In the present embodiment, where the return-to-normal determining means 106 (ST1) determines that the conditions under which the shift control means 102 resumes the normal shift control are satisfied, the return-to-normal permitting means 116 (ST12) permits the shift control means 102 to resume the normal shift control using the MEDIUM MODE shift pattern when the vehicle speed increase determining means 110 (ST7) determines that the vehicle speed V has increased. Since it is known that shift shocks due to shift-up actions may be reduced while the vehicle speed is increased, the driver will not feel so uncomfortable even if a shift-up action occurs immediately after the shift control means 102 resumes the normal shift control.

Further, in the present embodiment, where ST11 corresponding to the vehicle turn determining means 120 and return-to-normal inhibiting means 122 determines that the vehicle is in a turning condition, the execution of ST12 to resume the shift control using the MEDIUM MODE shift pattern is inhibited, and a shift-up action is avoided during turning of the vehicle, thus assuring improved running stability during vehicle turning.

Moreover, in the present embodiment, where ST9 corresponding to the brake ON determining means 114 determines that the brake pedal 82 is being operated to apply the brakes, ST13 and ST14 are not executed, and ST12 for effecting the shift control using the MEDIUM MODE shift pattern due to a relatively small increase in the vehicle speed V is not executed during vehicle braking. In this arrangement, since a shift-up action does not occur while the brakes are applied, the driver will not feel uncomfortable by losing the feeling of speed reduction during braking. For example, when the brakes are applied while the vehicle is running on a downhill road with its speed increasing, the vehicle speed increases even after the start of the braking operation, until the brake effect actually appears. In such a case, if ST13 and ST14 are executed, a shift-up action may undesirably occur when the return to shift control using the MEDIUM MODE shift pattern is permitted in step ST12.

Referring to FIGS. 8 and 9 showing a routine for controlling return from the uphill/downhill running control, SU1 is initially executed to determine whether the uphill/downhill running control means 92 is currently performing downhill running control. If a negative decision is obtained in SU1, SU2 is executed to determine whether the uphill/downhill running control means 92 is currently performing uphill running control. If an affirmative decision is obtained in SU1, SU3 is executed to determine whether the vehicle is running on a downhill road. If an affirmative decision is obtained in SU2, SU4 is executed to determine whether the vehicle is running on an uphill road.

If negative decisions are obtained in both SU1 and SU2, SU5 is executed to determine that the uphill/downhill running control by the uphill/downhill control means 92 is not being effected. SU6 is then executed to stop the counting operation of the return-to-normal timer $C_{NORM}$, and also clear the content of a return process flag $I_{DEND}$ to "0", and then the present routine is terminated. If affirmative decisions are obtained in both SU1 and SU3, or in both SU2 and SU4, SU7 determines that the uphill/downhill running control of the uphill/downhill running control means 92 is continued, and the SU6 as described above is executed.

If an affirmative decision is obtained SU1 but a negative decision is obtained in SU3, or if an affirmative decision is obtained in SU2 but a negative decision is obtained in SU4, conditions under which the uphill running control or downhill running control can be terminated are satisfied, and SU8 and following steps are executed. SU8 is initially executed to determine whether the content of the return process flag $I_{DEND}$ is "1" or not. Since a negative decision is initially obtained in SU8, SU9 is executed to determine whether the brakes are being applied, based on a signal from the brake switch 84. If an affirmative decision is obtained in SU9, the content of the return-to-normal timer CNORM is reset in SU10, and the present routine is terminated. If a negative decision is obtained in SU10, SU11 is executed to determine whether the return-to-normal timer $C_{NORM}$ is in the counting operation. Since a negative decision is obtained in SU11 in the first control cycle, SU12 is executed to start the counting operation of the return-to-normal timer and the present routine is terminated.

Since an affirmative decision is obtained in SU11 in the next control cycle once the counting operation of the return-to-normal timer $C_{NORM}$ is started, the control flow goes to SU13 to determine whether the count content of the return-to-normal timer $C_{NORM}$, namely, the elapsed time from when the return-to-normal conditions were determined to be satisfied, exceeds a predetermined criterial value $C_2$ or not. The criterial value $C_2$ is one of conditions under which the uphill running control or downhill running control can be terminated. This value $C_2$ is also used for storing the vehicle speed detected upon termination of the uphill/downhill running control, namely, the return-to-normal decision time vehicle speed $V_{XGEND}$ detected when the conditions under which the shift control using the normal shift pattern is resumed by terminating the uphill/downhill running control are satisfied. Although a negative decision is initially obtained in SU13, an affirmative decision is obtained in SU13 once the predetermine time $C_2$ elapses, and SU14 is executed to set the content of the return process flag $I_{DEND}$ to "1", and store the vehicle speed V detected at this time as the return-to-normal decision time vehicle speed $V_{XGED}$ obtained when the conditions to terminate the uphill/downhill running control are satisfied.

After the content of the return process flag $I_{DEND}$ is set to "1", an affirmative decision is obtained in step SU8. In the following control cycles, therefore, SU15 and the following steps are executed immediately after a negative decision is obtained in SU3 or SU4. In SU15, it is determined whether the vehicle is being braked, based on a signal from the brake switch 84. If a negative decision is obtained in SU15, SU16 is executed to determine whether the current vehicle speed V is larger than a value obtained by adding a predetermined value $K_3$ to the return-to-normal decision time vehicle speed $V_{XGEND}$, namely, whether the vehicle speed V has increased after the return-to-normal decision was made.

If an affirmative decision is obtained in SU16, SU19 is executed to clear the return-to-normal decision time vehicle speed $V_{XGEND}$ to "0", stop the return-to-normal timer $C_{NORM}$, and clear the content of the return process flag $I_{DEND}$ to "0". This step is executed to terminate the uphill/downhill running control, and cause the shift control means to resume the shift control in which the highest gear position (fourth-speed gear position) is not inhibited from being established, namely, the shift control using the shift pattern including the shift-up boundary line to the highest gear position. The thus resumed shift control of the shift control means 102 using the shift pattern including the shift-up boundary line to the highest gear position is effected using a shift pattern selected from the shift patterns shown in FIGS. 3, 4 and 5, for example, depending upon the drive mode actually desired by the driver.

In the cases where a negative decision is obtained in SU16, and where an affirmative decision is obtained in SU15, SU17 is executed to determine whether the current gear position coincides with the gear position to be established assuming that the shift control using the shift pattern including the shift-up line to the highest gear position is resumed. If an affirmative decision is obtained in SU17, SU19 is immediately executed since the transmission will not be shifted up in this case. If a negative position is obtained in SU17, SU18 is executed to determine whether the accelerator pedal 58 has been released. If a negative decision is obtained in SU18, the present routine is terminated. If an affirmative decision is obtained SU19 as described above is executed, and the shift control using the shift pattern (MEDIUM MODE shift pattern of FIG. 4, for example) having the shift-up line to the highest gear position is resumed.

In the present embodiment in which the return-to-normal control of FIG. 8 and 9 is implemented, there are provided: the uphill/downhill running control means 92 for detecting the slope of the road surface by comparing the acceleration on a flat road and the actual acceleration, based on the throttle opening angle TA, and inhibiting the highest gear position (fourth-speed gear position in the present embodiment) when the slope of the uphill road or downhill road is equal to or greater than a predetermined value; and the shift pattern selecting means 100 for selecting a shift pattern that does not include the shift-up boundary line to the highest gear position during the uphill/downhill running control of the uphill/downhill running control means 92, as the shift pattern used by the shift control means 102. The return-to-normal determining means 106 (SU1–SU4, SU9–SU13) determines whether conditions under which the shift pattern selecting means 100 switches from the shift pattern that does not include the shift-up boundary line to the highest gear position to the shift pattern (a predetermined shift pattern) including the shift-up boundary line to the highest gear position are satisfied or not, depending upon whether the uphill/downhill running control is effected by the uphill/downhill running control means 92. It is generally known that a shift-up action occurs in the shift control of the shift control means 102, when the accelerator pedal 58 is released. Where the return-to-normal determining means 106 (SU1–SU4, SU9–SU13) determines that the conditions under which the shift control means 102 resumes normal shift control using a shift pattern including a shift-up line to the highest gear position are satisfied, the return permitting means 116 (SU19) permits the shift control means 102 to resume the normal shift control when the output control member release determining means 108 (SU18) determines the operation to release the accelerator pedal 58. In this arrangement, the driver will not feel uncomfortable even if a shift-up action occurs immediately after the shift control means 102 resumes the normal shift control.

Further, in the present embodiment, where the return-to-normal determining means 106 (SU1–SU4, SU9–SU13) determines that the conditions under which the shift control means 102 resumes the shift control using the normal shift pattern are satisfied, the return-to-normal permitting means 116 (SU19) permits the shift control means 102 to resume the normal shift control using the shift pattern including the shift-up boundary line to the highest gear position when the vehicle speed increase means 110 (SU16) determines that the vehicle speed V has increased. It is generally known that shift shocks due to shift-up actions may be alleviated or reduced when the vehicle speed is increased. Thus, the driver will not feel so uncomfortable even if a shift-up action occurs immediately after the shift control means 102 resumes the normal shift control.

In the present embodiment, where SU15 corresponding to the brake ON determining means 114 determines that the brake pedal 92 is being operated to apply the brakes, SU16 is not executed whereby SU19 is not executed based on the determination on the increase in the vehicle speed V. Thus, SU19 wherein the normal shift control using the shift pattern including the shift-up line to the highest gear position is resumed upon detecting of a relatively small increase in the vehicle speed V is not executed during braking of the vehicle, and therefore the driver does not feel uncomfortable due to loss of the feeling of speed reduction which would be otherwise caused by a shift-up action occurring during the vehicle braking.

In FIG. 10 showing a routine for controlling return from position hold control, SV1 is executed to determine whether the position hold control means 94 as described above is performing the position hold control. If a negative decision is obtained in SV1, the present routine is terminated. If an affirmative decision is obtained, SV2 is executed to determine whether the uphill/downhill running control means 92 is performing the uphill/downhill running control. If a negative decision is obtained in SV2, SV3 is then executed to determine whether the O/D OFF switch 81 is in the ON state or not.

If an affirmative decision is obtained in either SV2 or SV3, SV10 is executed to determine whether the automatic transmission 14 is currently placed in the third-speed gear position. In the case where a negative decision is obtained in SV10, or where a negative decision is obtained in SV3, SV4 and following steps are executed to determine the conditions under which the gear position hold control can be cancelled, for example. If an affirmative decision is obtained in SV10, SV14 is executed to determine whether the vehicle is turning or not. If an affirmative decision is obtained in this step, the present routine is terminated. If a negative decision is obtained, SV15 is executed to cancel the position hold control, resume the shift control using a normal shift pattern, and stop a position hold cancel timer $C_{HOLD}$.

In SV4, it is determined whether the current gear position coincides with the gear position to be established assuming that the shift control using a normal shift pattern such as the MEDIUM MODE shift pattern of FIG. 4 is resumed. If an affirmative decision is obtained in SV4, SV14 and following steps are executed since there is no possibility of occurrence of a shift-up action. If a negative decision is obtained in SV4, SV5 is executed to determine whether the vehicle speed V is greater than a value obtained by adding a predetermined value $K_4$ to a vehicle speed detected when the vehicle is re-accelerated, which is called IDLE OFF vehicle speed $V_{IDLOF}$.

If an affirmative decision is obtained in SV5, SV14 and following steps are executed. If a negative decision is obtained, SV6 is executed to determine whether the accelerator pedal 58 has been released or not. If an affirmative decision is obtained in SV6, SV14 and following steps are executed. If a negative decision is obtained in SV6, SV7 is executed to determine whether the brakes are being applied, based on a signal from the brake switch 84. If an affirmative decision is obtained in SV7, the present routine is terminated. If a negative decision is obtained, SV8 is executed to determine whether the throttle opening angle TA is smaller than a predetermined criterial value TA,, and if an affirmative decision is obtained in SV8, SV9 is executed to determine whether the speed of depressing the accelerator pedal 58, namely, a change rate $\Delta TA$ of the throttle valve opening TA is smaller than a predetermined criterial value $\Delta TA_1$. The criterial value $TA_1$ and criterial value $\Delta TA_1$ are used to determine the re-accelerating operation done by the driver, which is one of the conditions under which the position hold control is to be cancelled.

When a negative decision is obtained in either SV8 or SV9, almost all of the conditions for cancelling the position hold control are satisfied. In SV11, therefore, the position hold cancel timer $C_{HOLD}$ starts counting, and the vehicle speed V detected at this time is stored as a hold cancel decision time vehicle speed $V_{HOLD}$. Thereafter, the present routine is terminated.

Once the re-accelerating operation is effected as described above, the normal shift control is resumed in SV15 if an affirmative decision is obtained in any of SV4 to SV6 in the next control cycle or affirmative decisions are obtained in both SV12 and SV13 as described later, provided that SV14 determines that the vehicle is not turning.

Namely, it is determined in SV12 whether the elapsed time counted by the position hold cancel timer $C_{HOLD}$ exceeds a predetermined criterial value $C_3$. This criterial value C3 is one of the conditions for determining whether the normal shift control is resumed based on determination on an increase in the vehicle speed. If a negative decision is obtained in SV12, the present routine is terminated. If an affirmative decision is obtained in SV12, S13 is executed to determine whether the vehicle speed V is larger than the hold cancel decision time vehicle speed $V_{HOLD}$, namely, whether the vehicle speed V has increased since the decision to cancel the position hold control was made. If a negative decision is obtained in SV13, the present routine is terminated. If an affirmative decision is obtained in SV13, the normal shift control is resumed in SV15 provided that SV14 determines that the vehicle is not turning.

As described above, in the present embodiment in which the return-to-normal control is performed, there are provided: the position hold control means 94 for effecting position hold control by detecting that the throttle valve 68 is suddenly closed to its idle position (fully closed position) and inhibiting shifting-up from the gear position held before the value 68 is suddenly closed, or effecting position hold control by shifting down the transmission in earlier timing than that defined by a corresponding shift-down boundary line when the brakes are suddenly applied, and inhibiting shifting-up from the gear position to which the transmission is shifted down even after the brakes are released. The return-to-normal determining means 106 (SV4–SV9) determines whether the conditions under which the shift control means 102 can effect the shift control using a normal shift pattern (for example, shift pattern of FIG. 4) are satisfied, depending upon whether the conditions for terminating the position hold control of the position hold control means 95 are satisfied. It is generally known that a shift-up action occurs in the shift control of the shift control means 102 when the accelerator pedal 58 is released. Where the return-to-normal determining means 106 (SV4–SV9) determines that the conditions under which the shift control means 102 resumes the shift control using the normal shift pattern are satisfied, the return-to-normal permitting means 116 (SV15) permits the shift control means 102 to resume the shift control using a shift pattern including a shift-up boundary line to the highest gear position when the output control member release determining means 108 (SV6) determines that the accelerator pedal 58 has been released. In this arrangement, therefore, the driver will not feel uncomfortable even if a shift-up action occurs immediately after the shift control means 102 resumes the normal shift control.

In the present embodiment, if the return-to-normal determining means 106 (SV4–SV9) determines that the conditions under which the shift control means 102 resumes the shift control using the normal shift pattern are satisfied, the return-to-normal permitting means 116 (SV15) permits the shift control means 102 to resume the normal shift control when the vehicle speed increase determining means 110 (SV13) determines that the vehicle speed V has increased. It is generally known that shift shocks due to shifting-up of the transmission are alleviated or reduced when the vehicle speed increases. Accordingly, the driver does will not feel so uncomfortable even if a shift-up action occurs immediately after the shift control means 102 resumes the normal shift control.

Further, in the present embodiment, when SV14 corresponding to the vehicle turn determining means 120 and return-to-normal inhibiting means 122 determines that the vehicle is turning, execution of SV15 to resume the shift control using the normal shift pattern including the shift-up boundary line to the highest gear position is inhibited, so as to avoid a shift-up action while the vehicle is turning, thereby assuring an improved running stability during turning of the vehicle.

Moreover, in the present embodiment, when SV7 corresponding to the brake ON determining means 114 determines that the brake pedal 82 is being operated to apply the brakes, SV13 is not executed to thereby avoid execution of SV15 wherein the return-to-normal operation is effected based on an increase in the vehicle speed V. Thus, SV15 for effecting the shift control using the normal shift pattern due to a relatively small increase in the vehicle speed V is not executed during braking of the vehicle. Accordingly, the driver will not feel uncomfortable due to loss of the feeling of speed reduction caused by a shift-up action that would otherwise take place during vehicle braking.

Another embodiment of the present invention will be next explained. In the following description, the same reference numerals as used in the previous embodiment will be used to identify corresponding elements.

Figure 11:
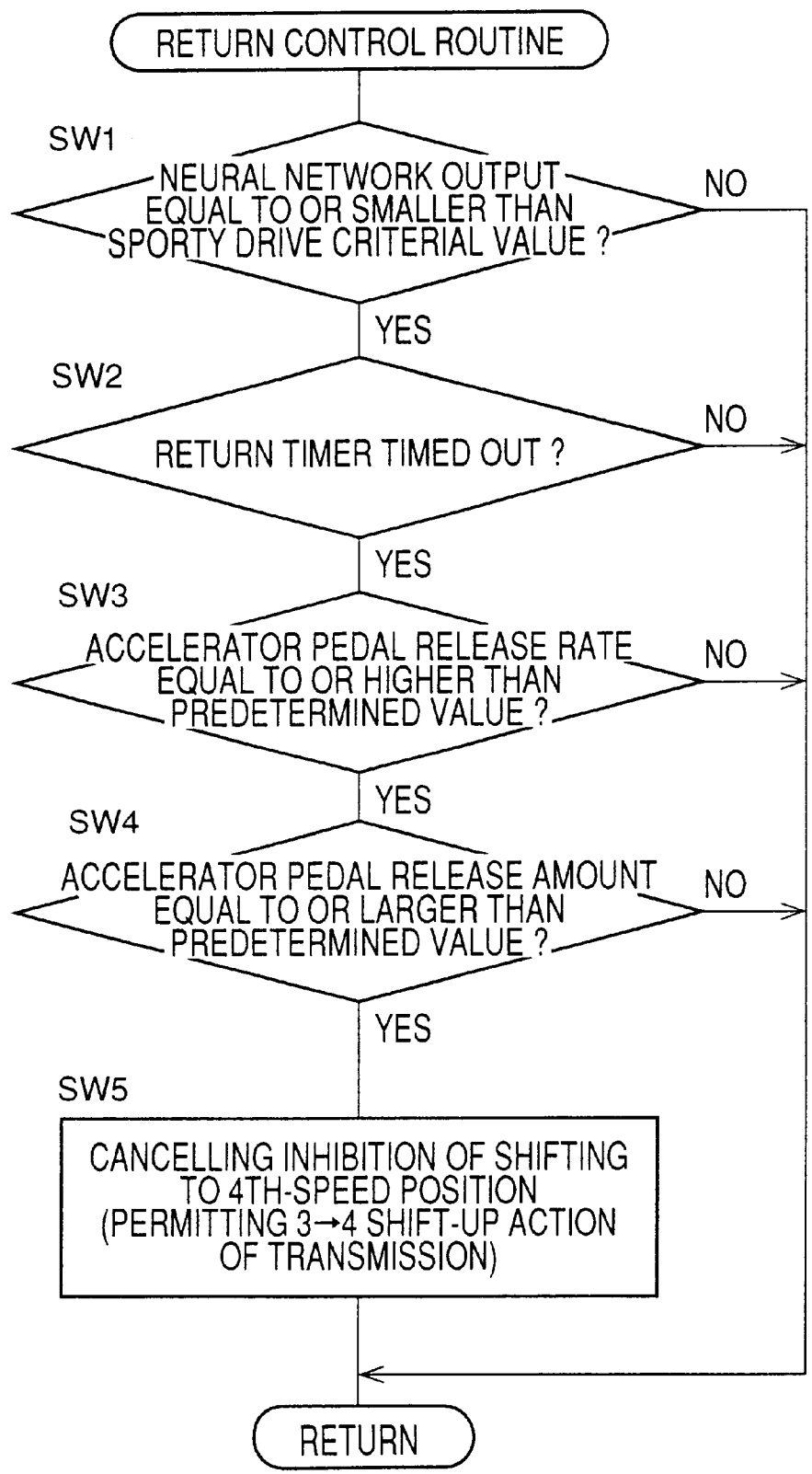
FIG. 11 is a flow chart explaining return-to-normal control routine in association with switching from the SPORTY DRIVE mode to the MEDIUM DRIVE mode, as a principal control operation of the electronic control device of FIG. 1.
Figure 12:
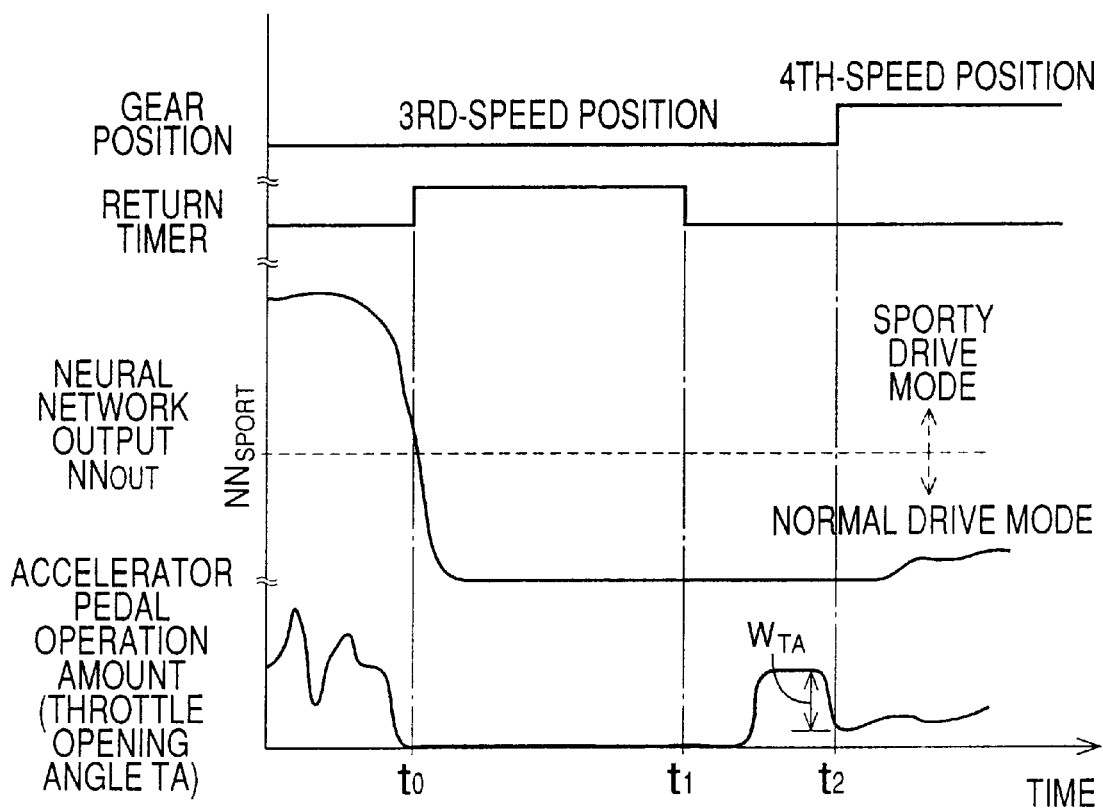
FIG. 12 is a time chart showing the control operation of the embodiment of FIG. 11.

The flow chart of FIG. 11 and the time chart of FIG. 12 show return-to-normal control for ruing the normal shift control using the MEDIUM MODE shift pattern. This return-to-normal control is effected where the accelerator pedal 58 is released while the vehicle is running in the third-speed gear position determined in the SPORTY MODE shift pattern, so as to permit a shift-up action when the drive mode determining means 90 determines that the SPORTY DRIVE mode (flag $X_{SPORT}=1$) indicative of a desire for high output running is to be changed to the MEDIUM (NORMAL) DRIVE mode (flag $X_{NORM}=1$) indicative of a desire for a medium or normal running, and the shift pattern selecting means 100 switches from the SPORTY MODE shift pattern of FIG. 3 to the MEDIUM MODE shift pattern of FIG. 4. The shift-up action is allowed to take place when a predetermined criterial time $C_3$ has elapsed since the shift-up action is determined to take place, and the accelerator pedal 58 has been released.

Where the accelerator pedal 58 is released while the vehicle is running in the SPORTY DRIVE mode with the transmission being placed in the third-speed gear position, the return-to-normal control routine of FIG. 11 is executed when a shift-up action from the third-speed gear position to the fourth-speed gear position is determined to take place, in such a situation that the drive mode determining means 90 determines that the SPORTY DRIVE mode in which high output running is desired is to be changed to the MEDIUM (NORMAL) DRIVE mode in which medium running is desired, and the SPORTY MODE shift pattern shown in FIG. 3 is switched to the MEDIUM MODE shift pattern shown in FIG. 5. Namely, the routine of FIG. 11 is started at a point of time $t_0$ in FIG. 12.

In SW1 of FIG. 11, it is determined whether the neural network output value $NN_{OUT}$ is equal to or smaller than a SPORTY DRIVE criterial value $NN_{SPORT}$ or not. If a negative decision is obtained in SW1, the present routine is terminated. If an affirmative decision is obtained in SW1, SW2 corresponding to the time lapse monitoring means 107 is executed to determine whether a predetermined criterial time $C_3$ has elapsed since a shift-up action is determined to take place, in such a situation that the drive mode determining means 90 determines that the SPORTY DRIVE mode (flag $X_{SPORT}=1$) indicative of a desire for high output running is to be changed to the MEDIUM (NORMAL) DRIVE mode (flag $X_{NORM}=1$) indicative of a desire for medium or normal running, and the shift pattern selecting means 100 switches from the SPORTY MODE shift pattern of FIG. 3 to the MEDIUM MODE shift pattern of FIG. 4. This criterial time C3 is set to a time value required to stabilize the neural network output value $NN_{OUT}$ which varies in relation to the releasing operation of the accelerator pedal 58, for example.

If a negative decision is obtained in SW2, the present routine is terminated. If an affirmative decision is obtained, SW3 is executed to determine whether the releasing speed $|d(TA)/dt|$ of the accelerator pedal 58 is equal to or higher than a predetermined value. The point of time $t_1$ in FIG. 12 indicates this operating state. If a negative decision is obtained in SW3, the present routine is terminated. If an affirmative decision is obtained in SW3, SW4 is executed to determine whether the releasing amount of the accelerator pedal 58, namely, a varying width $W_{TA}$ measured from the time when the pedal 58 starts being released, is equal to or greater than a predetermined value. If a negative decision is obtained in SW4, the present routine is terminated. If an affirmative decision is obtained, SW5 corresponding to the return-to-normal permitting means 116 is executed to cancel inhibition of shifting to the fourth-speed gear position, to permit the shift-up action from the third-speed gear position to the fourth-speed gear position. Namely, in this step, the shift control means 102 is allowed to resume the normal shift control using the MEDIUM MODE shift pattern of FIG. 4. The point of time $t_2$ in FIG. 12 indicates this operating state.

As described above, in the present embodiment, where the shift-up action from the third-speed gear position to the fourth-speed gear position is determined to take place when the drive mode determining means 90 determines that the SPORTY DRIVE mode as a desire for the high output running is to be changed to the MEDIUM (NORMAL) DRIVE mode as a desired for the medium or normal running, and the DRIVE MODE shift pattern of FIG. 3 is switched to the MEDIUM MODE shift pattern of FIG. 4, the shift-up action is not immediately effected even if the return-to-normal timer times out, but the return-to-normal permitting means 116 (SW5) permits shifting-up to the fourth-speed gear position at the same time as the releasing operation of the accelerator pedal 58 takes place. Accordingly, the automatic transmission is not suddenly or unexpectedly shifted up upon returning to the normal shift control, and the driver will not feel uncomfortable about an otherwise possible unexpected shift-up action. Also, the transmission is prevented from being shifted up to the fourth-speed gear position while the vehicle is turning, even if the accelerator pedal 58 is released.

Figure 13:
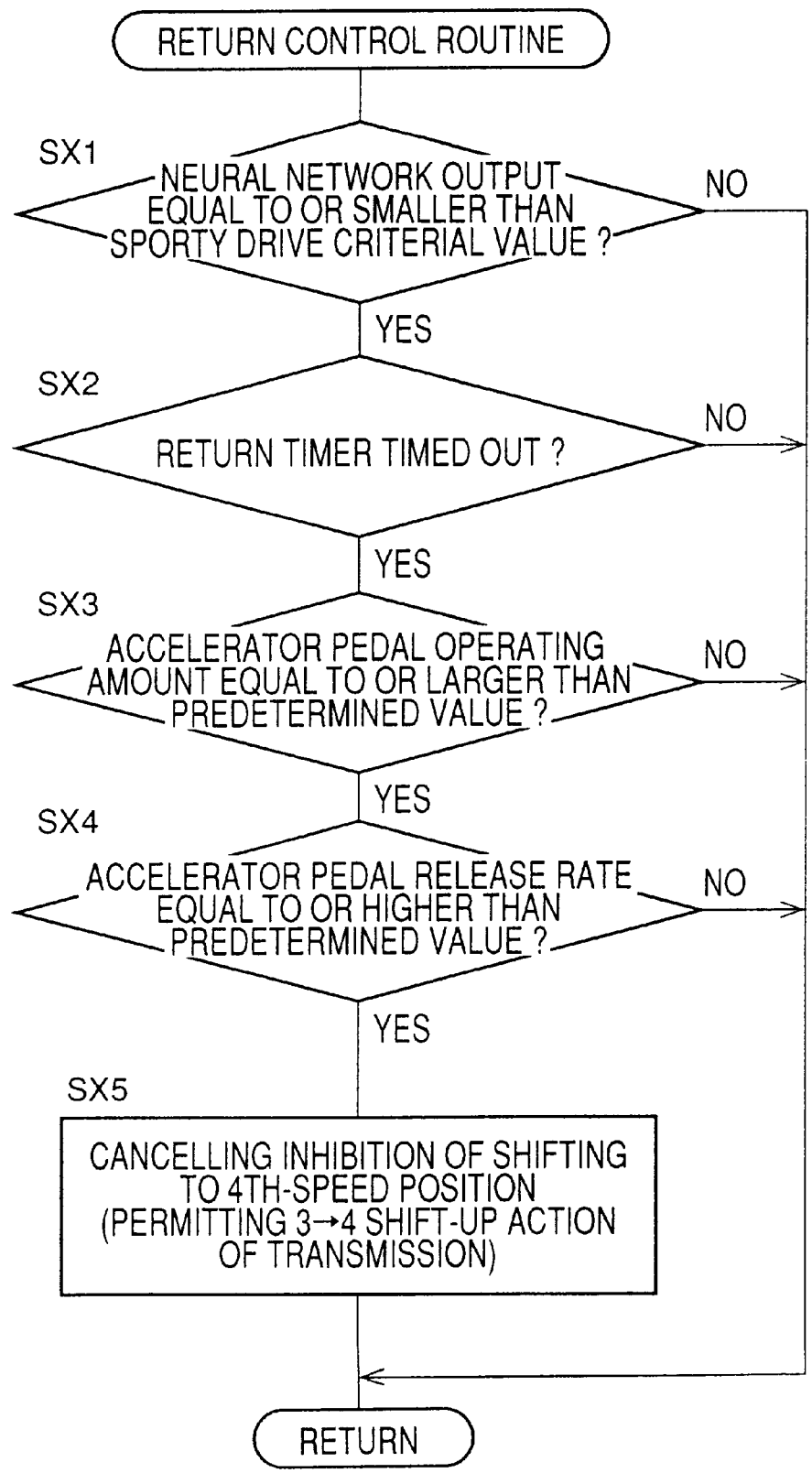
FIG. 13 is a view corresponding to that of FIG. 11, showing a return-to-normal control routine according to another embodiment of the present invention.
Figure 14:
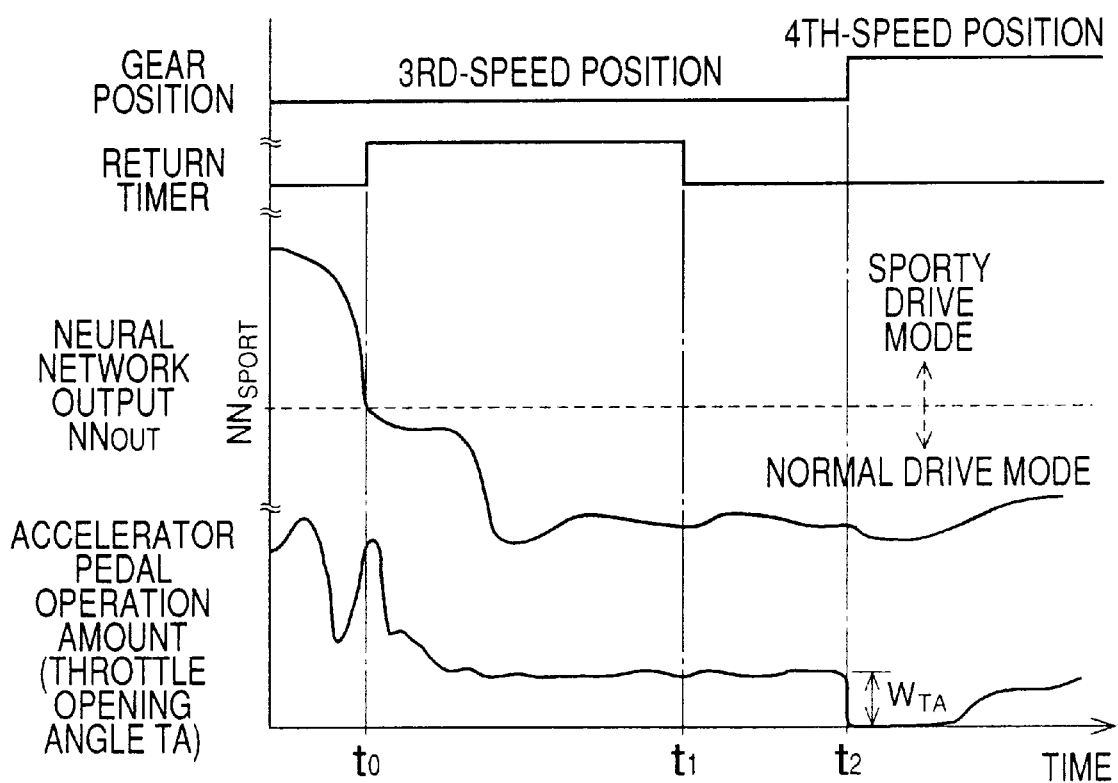
FIG. 14 is a time chart showing the control operation of the embodiment of FIG. 13.

FIG. 13 and FIG. 14 are a flow chart and a time chart according to another embodiment, which correspond to those of FIG. 11 and FIG. 12. As in FIG. 11, the flow chart of FIG. 13 starts being executed at a point of time to shown in FIG. 14.

As in the SW1 as described above, SX1 of FIG. 13, is executed to determine whether the neural network output value $NN_{OUT}$ is equal to or smaller than the SPORTY DRIVE criterial value $NN_{SPORT}$. SX2 similar to SW2 is then executed to determine whether the predetermined criterial value $C_3$ has elapsed since a shift-up action is determined to take place, in such a situation that the drive mode determining means 90 determines that the SPORTY DRIVE mode as a desire for high output running is to be changed to the MEDIUM (NORMAL) DRIVE mode as a desire for medium or normal running, and the shift pattern selecting means 100 switches from the SPORT MODE shift pattern shown in FIG. 3 to the MEDIUM MODE shift pattern shown in FIG. 4.

If affirmative decisions are obtained in both SX1 and SX2, SX3 is executed to determine whether the operated amount TA of the accelerator pedal 58 is equal to or greater than a predetermined value. The point of time $t_1$ in FIG. 14 indicates this operating state. If a negative decision is obtained in SX3, the present routine is terminated. If an affirmative decision is obtained in SX3, SX4 is then executed to determine whether the releasing speed $|d(TA)/dt|$ of the accelerator pedal 58 is equal to or higher than a predetermined value. If a negative decision is obtained in SX4, the present routine is terminated. If an affirmative decision is obtained in this step, SX5 corresponding to the return-to-normal permitting means 116 is executed to cancel inhibition of shifting-up to the fourth-speed gear position, and allow the transmission to be shifted up from the third-speed gear position to the fourth-speed gear position. Namely, in this step, the shift control means 102 is allowed to resume the normal shift control using the MEDIUM MODE shift pattern of FIG. 4. The point of time $t_2$ in FIG. 14 indicates this operating state.

In the present embodiment, too, where the shift-up action from the third-speed gear position to the fourth-speed gear position is determined to take place when the drive mode determining means 90 determines that the SPORTY DRIVE mode as a desire for the high output running is to be changed to the MEDIUM (NORMAL) DRIVE mode as a desired for the medium or normal running, and the DRIVE MODE shift pattern of FIG. 3 is switched to the MEDIUM MODE shift pattern of FIG. 4, the shift-up action is not immediately effected even if the return-to-normal timer times out, but the return-to-normal permitting means 116 (SX5) permits shifting-up to the fourth-speed gear position at the same time as the releasing operation of the accelerator pedal 58 takes place. Accordingly, the automatic transmission is not suddenly or unexpectedly shifted up upon returning to the normal shift control, and the driver will not feel uncomfortable about an otherwise possible unexpected shift-up action.

While the presently preferred embodiments of the present invention have been explained referring to the drawings, it is to be understood that the present invention may be otherwise embodied.

While the return-to-normal control of FIG. 7 as described above is concerned with returning from the shift control using the SPORTY MODE shift pattern to the shift control using the MEDIUM MODE shift pattern, the present invention may be also applied to the return-to-normal control in which the shift control using the SPORTY MODE shift pattern or MEDIUM MODE shift pattern is changed back to the shift control using the ECONOMY MODE shift pattern.

The electronic control device of FIG. 1 is adapted to perform the return-to-normal control of FIG. 7 for changing the shift control using the SPORTY MODE shift pattern to the shift control using the MEDIUM MODE shift pattern, return-to-normal control of FIG. 8 and FIG. 9 for changing the uphill/downhill running control to the normal shift control using a shift pattern including a shift-up boundary line to the highest gear position, and the return-to-normal control of FIG. 10 for changing the position hold control to the normal shift control. The control device of the present invention may be adapted to change other control to the normal shift control or effect one of the above three return-to-normal controls.

While the return to the normal shift control is permitted upon determination of the releasing operation of the accelerator pedal 58 and upon determination of an increase in the vehicle speed in the return-to-normal controls of FIGS. 7, 8, 9 and 10 as described above, the normal shift control may be resumed when only one of the above determinations is made.

The conditions under which the drive mode is determined, namely, conditions under which the shift control using the SPORTY MODE shift pattern is changed to the shift control using the MEDIUM MODE shift pattern, conditions under which the uphill/downhill running control is initiated and terminated, and the conditions under which the position hold control is initiated and terminated used in the illustrated embodiments may be changed or include additional conditions as needed.

The shift pattern selecting means 100 of the illustrated embodiments is adapted to select one shift pattern corresponding to the actual drive mode, from a plurality of shift patterns, based on the result of determination by the drive mode determining means 90. It is, however, possible to substantially change the shift pattern by modifying a vehicle speed at a change gear point obtained from the MEDIUM MODE shift pattern, for ale, based on the result of the determination by the drive mode determining means 90.

The throttle opening angle TA of SV8 and the throttle opening angle increasing speed or rate ΔTA of SV9 as used in the illustrated embodiment may be replaced by the operated amount and depressing speed of the accelerator pedal 58, respectively.

While the present invention has been described in its preferred embodiments, for illustrative purpose only, it is to be understood that the present invention may be embodied with various other changes or modifications, without departing from the principle of the invention.

What is claimed is:

1. A shift control apparatus for an automatic transmission of a motor vehicle having an engine, including shift control means for selecting one of a plurality of gear position of the automatic transmission selectively in a first, normal shift control according to a predetermined first shift pattern or in a second shift control according to a predetermined second shift pattern, based on a driving condition of the vehicle, and automatically shifting the automatic transmission to the selected gear position, comprising:

output control member release determining means for determining whether an output control member for controlling an output of said engine has been released;

return-to-normal determining means for determining whether a predetermined return-to-normal condition under which said shift control means resumes said first, normal shift control using said predetermined first shift pattern after said second shift control using said predetermined second shift pattern is satisfied, said return-to-normal condition causing the automatic transmission to be shifted up by said shift control means immediately after the normal shift control using the predetermined first shift pattern is resumed; and return-to-normal permitting means for permitting said shift control means to resume the first, normal shift control when said output control member release determining means determines that said output control member has been released, after said return-to-normal determining means determines that the predetermined return-to-normal condition is satisfied.

2. A shift control apparatus for an automatic transmission of a motor vehicle according to claim 1, further comprising:

vehicle turn determining means for determining whether the vehicle is turning; and return-to-normal inhibiting means for inhibiting said return-to-normal permitting means from permitting said shift control means to resume the normal shift control, when said vehicle turn determining means determines that the vehicle is turning.

3. A shift control apparatus for an automatic transmission of a motor vehicle according to claim 1, wherein said first shift pattern is expressed on a two dimensional graph having an axis representing an opening angle of a throttle valve or an amount indicating a load of said engine, and an axis representing a running speed of said motor vehicle, said shift control means selecting one of said plurality of gear positions according to said predetermined first or second shift pattern, based on an actual value of said opening angle and an actual value of said running speed.

4. A shift control apparatus for an automatic transmission of a motor vehicle according to claim 3, wherein said shift control means determines that the transmission is to be shifted up when said opening angle of said throttle valve is reduced.

5. A shift control apparatus for an automatic transmission of a motor vehicle according to claim 1, further comprising:

drive mode determining means for determining a drive mode of the motor vehicle, based on at least one drive mode indicating variable that varies in relation to a drive mode desired by a driver of the motor vehicle; and shift pattern selecting means for selecting the shift pattern used by said shift control means, depending upon a result of determination by said drive mode determining means, from a plurality of shift patterns including an ECONOMY MODE shift pattern, a MEDIUM MODE shift pattern as said predetermined first, normal shift pattern and a SPORTY MODE shift pattern as said predetermined second shift pattern; wherein said return-to-normal determining means determines whether a condition under which said shift pattern selecting means switches from the SPORTY MODE shift pattern to the MEDIUM MODE shift pattern is satisfied, to determine whether said return-to-normal condition is satisfied, depending upon whether said drive mode determining means determines a change from a SPORTY DRIVE mode to a MEDIUM DRIVE mode.

6. A shift control apparatus for an automatic transmission of a motor vehicle according to claim 1, further comprising:

uphill/downhill running control means for inhibiting a highest gear position from being established when a slope of an uphill road or downhill road on which the vehicle is actually running exceeds a predetermined value, so as to improve drivability on an inclined road; wherein said return-to-normal determining means determines whether said return-to-normal condition is satisfied, depending upon whether a condition for cancelling uphill/downhill running control of said uphill/downhill running control means is satisfied.

7. A shift control apparatus of an automatic transmission for a motor vehicle according to claim 1, further comprising:

position hold control means for performing position hold control for inhibiting the transmission from being shifted up when sudden closing of a throttle valve is detected, or performing position hold control for shifting down the transmission in earlier timing than that defined by a shift-down line in the first shift pattern when a brake is suddenly applied, and holding the gear position to which the transmission is shifted down even after the brake is released; wherein said return-to-normal determining means determines whether said return-to-normal condition is satisfied, depending upon whether a condition for cancelling the position hold control of said position hold control means is satisfied.

8. A shift control apparatus for an automatic transmission of a motor vehicle according to claim 1, further comprising;

time lapse monitoring means for determining whether a predetermined time has elapsed after said return-to-normal determining means determines that said return-to-normal condition is satisfied;

and wherein said return-to-normal permitting means permits said shift control means to resume said normal shift control using the predetermined first shift pattern, when said time lapse monitoring means determines that said predetermined time has elapsed after the return-to-normal condition is satisfied, and when said output control member release determining means determines that said output control member has been released.

9. A shift control apparatus for an automatic transmission of a motor vehicle according to claim 8, wherein said output control member release determining means determines that said output control member has been released, when a releasing speed of the output control member is not smaller than a predetermined value, and when a released amount of the output control member is not smaller than a predetermined value.

10. A shift control apparatus for an automatic transmission of a motor vehicle according to claim 8, wherein said output control member release determining means determines that said output control member has been released, when an operated amount of the output control member is not smaller than a predetermined amount, and when a releasing speed of the output control member is not smaller than a predetermined value.

11. A shift control apparatus for an automatic transmission of a motor vehicle, including shift control means for selecting one of a plurality of gear position of the automatic transmission selectively in a first, normal shift control according to a predetermined first shift pattern or in a second shift control according to a predetermined second shift pattern, based on a driving condition of the vehicle, and automatically shifting the automatic transmission to the selected gear position, comprising:

vehicle speed increase determining means for determining whether a running speed of said motor vehicle has increased;

return-to-normal determining means for determining whether a predetermined return-to-normal condition under which said shift control means resumes said first, normal shift control using said predetermined first shift pattern after said second shift control using said predetermined second shift pattern is satisfied, said return-to-normal condition being likely to cause the automatic transmission to be shifted up by said shift control means immediately after the normal shift control using the predetermined first shift pattern is resumed; and return-to-normal permitting means for permitting said shift control means to resume the first, normal shift control when said vehicle speed increase determining means determines that said running speed of said motor vehicle has increased, after said return-to-normal determining means determines that the predetermined return-to-normal condition is satisfied.

12. A shift control apparatus for an automatic transmission of a motor vehicle according to claim 11, further comprising:

vehicle turn determining means for determining whether the vehicle is turning; and return-to-normal inhibiting means for inhibiting said return-to-normal permitting means from permitting said shift control means to resume the normal shift control, when said vehicle turn determining means determines that the vehicle is turning.

13. A shift control apparatus for an automatic transmission of a motor vehicle according to claim 1, wherein said first shift pattern is expressed on a two dimensional graph having an axis representing an opening angle of a throttle valve or an amount indicating a load of an engine of the motor vehicle, and an axis representing a running speed of said motor vehicle; and wherein said shift control means selects one of said plurality of gear positions according to said predetermined first or second shift pattern, based on an actual value of said opening angle and an actual value of said running speed.

14. A shift control apparatus for an automatic transmission of a motor vehicle according to claim 13, wherein said shift control means determines that the transmission is to be shifted up when said opening angle of said throttle valve is reduced.

15. A shift control apparatus for an automatic transmission of a motor vehicle according to claim 11, further comprising:

drive mode determining means for determining a drive mode of the vehicle, based on at least one drive mode indicating variable that varies in relation to a drive mode desired by a driver; and a shift pattern selecting means for selecting a shift pattern corresponding to a result of determination by said drive mode determining means, from a plurality of shift patterns including an ECONOMY MODE shift pattern, a MEDIUM MODE shift pattern and a SPORTY MODE shift pattern, as the shift pattern used by said shift control means; wherein said return-to-normal determining means determines whether a condition under which said shift pattern selecting means switches from the SPORTY MODE shift pattern to the MEDIUM MODE shift pattern is satisfied, namely, said return-to-normal condition is satisfied, depending upon whether said drive mode determining means determines a change from a SPORTY DRIVE mode to a MEDIUM DRIVE mode.

16. A shift control apparatus for an automatic transmission of a motor vehicle according to claim 11, further comprising:

uphill/downhill running control means for inhibiting a highest gear position from being established when a slope of an uphill road or downhill road on which the vehicle is actually running exceeds a predetermined value, so as to improve drivability on an inclined road; wherein said return-to-normal determining means determines whether said return-to-normal is satisfied, depending upon whether a condition for cancelling uphill/downhill running control of said uphill/downhill running control means is satisfied.

17. A shift control apparatus of an automatic transmission for a motor vehicle according to claim 11, further comprising:

position hold control means for performing position hold control for inhibiting the transmission from being shifted up when sudden closing of a throttle valve is detected, or performing position hold control for shifting down the transmission in earlier timing than that defined by a shift-down line in the first shift pattern when a brake is suddenly applied, and holding the gear position to which the transmission is shifted down even after the brake is released; wherein said return-to-normal determining means determines whether said return-to-normal condition is satisfied, depending upon whether a condition for cancelling the position hold control of said position hold control means is satisfied.

18. A shift control apparatus for an automatic transmission of a motor vehicle according to claim 11, further comprising:

vehicle braking determining means for determining whether the vehicle is being braked; wherein said return-to-normal permitting means is prevented from determining, based on an increase in the vehicle speed, whether the normal shift control means resumes the shift control using said predetermined first shift pattern, if said vehicle braking determining means determines that the vehicle is being braked.

* * * * *